US012769161B2

(12) United States Patent
Ohira

(10) Patent No.: US 12,769,161 B2
(45) Date of Patent: Oct. 20, 2026

(54) DISPLAY DEVICE

(71) Applicant: Magnolia White Corporation, Tokyo (JP)

(72) Inventor: Hirofumi Ohira, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/744,836

(22) Filed: Jun. 17, 2024

(65) Prior Publication Data

US 2024/0427180 A1 Dec. 26, 2024

(30) Foreign Application Priority Data

Jun. 20, 2023 (JP) ................................ 2023-100884

(51) Int. Cl.
*G02F 1/13* (2006.01)
*G02F 1/1335* (2006.01)
*G02F 1/1337* (2006.01)

(52) U.S. Cl.
CPC ...... *G02F 1/1323* (2013.01); *G02F 1/133528* (2013.01); *G02F 1/1337* (2013.01)

(58) Field of Classification Search
None
See application file for complete search history.

(56) References Cited

U.S. PATENT DOCUMENTS

2023/0127094 A1* 4/2023 Chen ...................... H10K 59/50 349/96

FOREIGN PATENT DOCUMENTS

JP 2006-195388 A 7/2006
WO WO-2021192567 A1 * 9/2021 ............. G02F 1/137

* cited by examiner

*Primary Examiner* — Shan Liu
(74) *Attorney, Agent, or Firm* — K&L Gates LLP

(57) ABSTRACT

According to an aspect, a display device includes: a display panel having a display region configured to output an image; a light source configured to emit light toward one surface side of the display panel; and a light adjuster interposed between the display panel and the light source and provided to be able to change a transmission degree of light between the display panel and the light source. In the light adjuster, a first polarization layer, a first liquid crystal panel, a second polarization layer, a second liquid crystal panel, and a third polarization layer are stacked from the light source side toward the display panel side; and one of the first and second liquid crystal panels is provided as an E-mode liquid crystal panel, and the other of the first and second liquid crystal panels is provided as an O-mode liquid crystal panel.

4 Claims, 14 Drawing Sheets

DISPLAY DEVICE

CROSS-REFERENCE TO RELATED APPLICATION

This application claims the benefit of priority from Japanese Patent Application No. 2023-100884 filed on Jun. 20, 2023, the entire contents of which are incorporated herein by reference.

BACKGROUND

1. Technical Field

What is disclosed herein relates to a display device.

2. Description of the Related Art

In recent display devices, there is a demand to be able to change the range of view angles in which an image can be viewed. For example, a display device mounted on a vehicle such as a four-wheel automobile is desired to achieve a view angle range in which an image can be viewed from the front passenger seat side and the image cannot be viewed from the driver seat side only during driving. To achieve such a view angle range, Japanese Patent Application Laid-open Publication No. 2006-195388 (JP-A-2006-195388) discloses technologies in which a liquid crystal panel for light adjustment with a switchable view angle range is placed over an image display panel.

However, with a display device disclosed in JP-A-2006-195388, a view angle at which an image is so dark that the image cannot be viewed due to a liquid crystal panel for light adjustment, is limited to an extremely narrow particular view angle. As a result, the image can be viewed in a view angle range outside the particular view angle in some cases. Thus, a display device that can simultaneously establish a view angle range in which the image can be viewed and a view angle range in which the image cannot be viewed, and that can more reliably ensure a wider view angle range in which the image cannot be viewed, has been required.

For the foregoing reasons, there is a need for a display device that can simultaneously establish a view angle range in which an image can be viewed and a view angle range in which the image cannot be viewed, and that can more reliably ensure a wider view angle range in which the image cannot be viewed.

SUMMARY

According to an aspect, a display device includes: a display panel having a display region configured to output an image; a light source configured to emit light toward one surface side of the display panel; and a light adjuster interposed between the display panel and the light source and provided to be able to change a transmission degree of light between the display panel and the light source. In the light adjuster, a first polarization layer, a first liquid crystal panel, a second polarization layer, a second liquid crystal panel, and a third polarization layer are stacked from the light source side toward the display panel side; and one of the first and second liquid crystal panels is provided as an E-mode liquid crystal panel, and the other of the first and second liquid crystal panels is provided as an O-mode liquid crystal panel.

DETAILED DESCRIPTION

An embodiment of the present disclosure is described below with reference to the drawings. What is disclosed herein is only an example, and any modification that can be easily conceived by those skilled in the art while maintaining the main purpose of the invention are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

Embodiment

Figure 1:
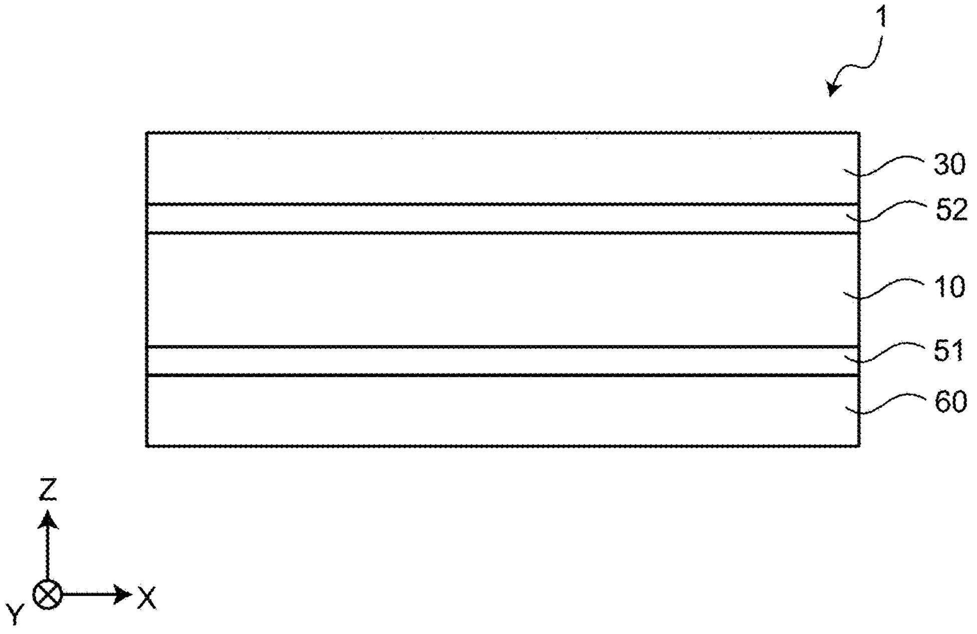
FIG. 1 is a schematic view illustrating an example of a main configuration of a display device according to an embodiment.

FIG. 1 is a schematic view illustrating an example of a main configuration of a display device 1 according to an embodiment. The display device 1 includes a light adjuster 10, a display panel 30, a light source 60, a retardation generation layer 51, and a retardation generation layer 52. A third direction Z is defined to be a direction in which the light adjuster 10, the display panel 30, the light source 60, the retardation generation layer 51, and the retardation generation layer 52 are stacked. A first direction X is defined to be one of two directions orthogonal to the third direction Z, and a second direction Y is defined to be the other direction thereof. The first direction X and the second direction Y are orthogonal to each other. In the display device 1, the light source 60, the retardation generation layer 51, the light adjuster 10, the retardation generation layer 52, and the display panel 30 are stacked in the stated order from one side in the third direction Z toward the other side.

Figure 2:
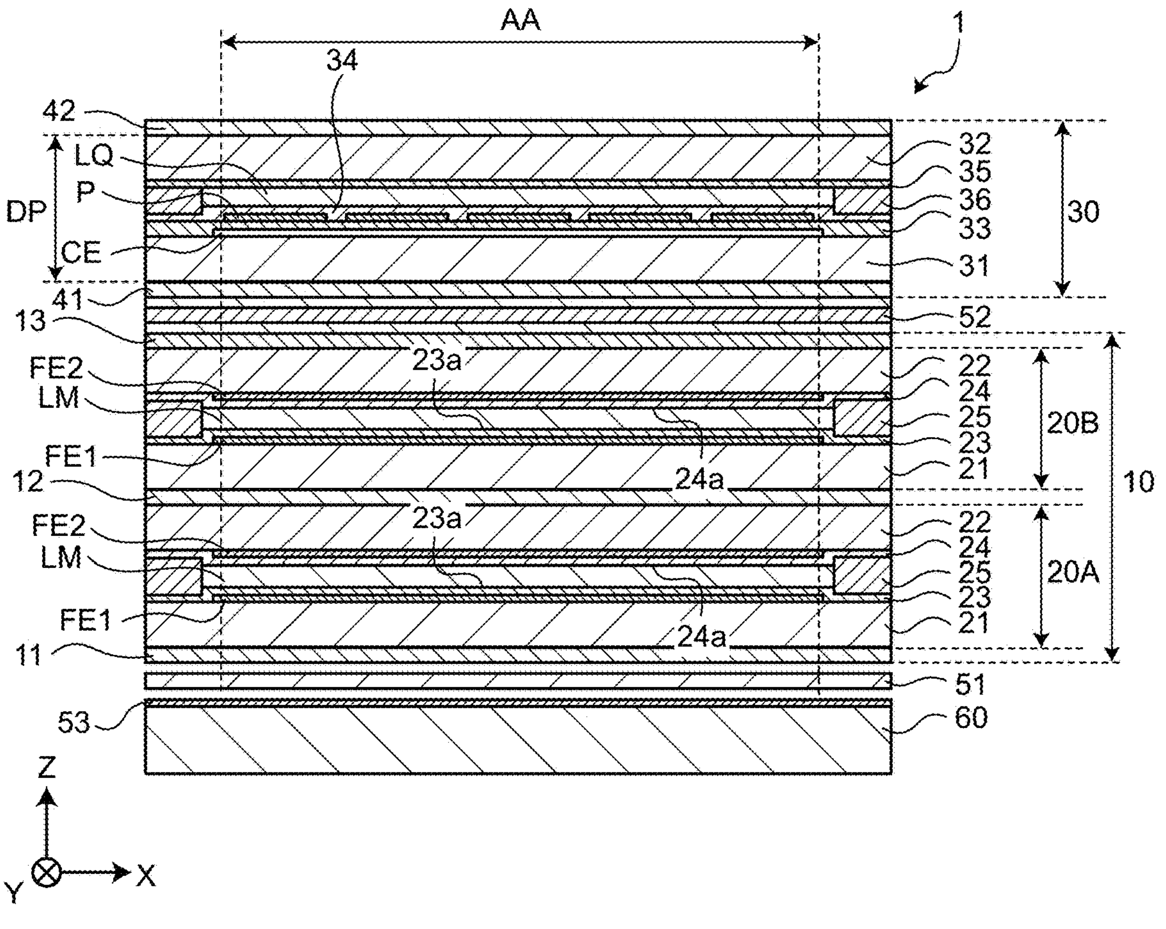
FIG. 2 is a schematic sectional view of components included in the display device.

FIG. 2 is a schematic sectional view of components included in the display device 1. FIG. 2 illustrates gaps provided between the light source 60 and the retardation generation layer 51, between the retardation generation layer 51 and the light adjuster 10, between the light adjuster 10 and the retardation generation layer 52, and between the retardation generation layer 52 and the display panel 30, respectively. The gaps, however, are illustrated to facilitate understanding of the diagram and are unnecessary in the actual display device 1 (refer to FIG. 1).

The light adjuster 10 has a configuration in which a first polarization layer 11, a first liquid crystal panel 20A, a second polarization layer 12, a second liquid crystal panel 20B, and a third polarization layer 13 are stacked from the one side in the third direction Z toward the other side. The first polarization layer 11, the second polarization layer 12, and the third polarization layer 13 as well as a fourth polarization layer 41 and a fifth polarization layer 42 to be described later are each an optical member provided to most transmit light polarized in a specific direction. The specific direction is referred to as a transmission axis direction. The transmission axis direction extends along a polarization plate. Accordingly, the transmission axis direction is orthogonal to the third direction Z. A direction orthogonal to the transmission axis direction and the third direction Z is referred to as an absorption axis direction. The absorption axis direction is a polarization direction in which light is most unlikely to pass through the polarization plate.

The first liquid crystal panel 20A and the second liquid crystal panel 20B are liquid crystal panels. The first liquid crystal panel 20A and the second liquid crystal panel 20B have the same device configuration except that they are provided at different positions. Hereinafter, the phrase "liquid crystal panel 20" collectively means the first liquid crystal panel 20A and the second liquid crystal panel 20B. Thus, description related to the liquid crystal panel 20 is applicable to both the first liquid crystal panel 20A and the second liquid crystal panel 20B. The liquid crystal panel 20 of the embodiment is a liquid crystal panel of what is called a twisted nematic (TN) type.

The liquid crystal panel 20 has a configuration in which a first substrate 21 is provided on the one side of liquid crystal LM and a second substrate 22 is provided on the other side thereof. The first substrate 21 and the second substrate 22 are light-transmitting substrates. The light-transmitting substrates are, for example, glass substrates but not limited thereto and may be substrates of any other light-transmitting material. Hereinafter, the phrase "one surface" means a surface of a plate-shaped component on the one side in the third direction Z. The phrase "the other surface" means a surface of the plate-shaped component on the other side in the third direction Z.

A first electrode FE1 is formed on the other surface of the first substrate 21. A second electrode FE2 is formed on one surface of the second substrate 22. The first electrode FE1 and the second electrode FE2 are electrodes provided to cover a display region AA. The other surface of the first electrode FE1 and the other surface of the first substrate 21 in an area in which the first electrode FE1 is not formed are covered by an insulating layer 23. One surface of the second electrode FE2 and the one surface of the second substrate 22 in an area in which the second electrode FE2 is not formed are covered by an insulating layer 24. The display region AA will be described later.

At least one of the first electrode FE1 and the second electrode FE2 is provided so that its potential can be changed in accordance with ON and OFF of operation of the liquid crystal panel 20. In other words, voltage generated between the first electrode FE1 and the second electrode FE2 is different between a case where the liquid crystal panel 20 is in operation (ON) and a case where the liquid crystal panel 20 is not in operation (OFF).

The liquid crystal LM is interposed at least in the display region AA between the insulating layer 23 and the insulating layer 24. A seal 25 is interposed between the insulating layer 23 and the insulating layer 24 outside the display region AA. Although not illustrated, the seal 25 is a frame-shaped member enclosing the liquid crystal LM when viewed at a viewpoint of viewing a plane (X-Y plane) orthogonal to the third direction Z from the front. The liquid crystal LM is surrounded by the seal 25 between the insulating layer 23 and the insulating layer 24, and thus, enclosed in the liquid crystal panel 20.

An alignment film 23*a* is provided on the other surface of the insulating layer 23 at least in an area where the display region AA is covered. An alignment film 24*a* is provided on one surface of the insulating layer 24 at least in an area where the display region AA is covered. The alignment films 23*a* and 24*a* align the orientation of each liquid crystal molecule contained in the liquid crystal LM with a particular direction. The orientation of each liquid crystal molecule changes as the potential difference between the first electrode FE1 and the second electrode FE2 changes.

The display panel 30 is a liquid crystal panel different from the liquid crystal panel 20. The display panel 30 includes a plurality of pixels. The display panel 30 is an image-display liquid crystal panel provided to be able to individually control the transmission degree of light at the position of each pixel in accordance with image data input from the outside.

The display panel 30 illustrated in FIG. 2 is a liquid crystal panel of what is called an in-plane switching (IPS) type. In the display panel 30, a pixel substrate 31 is provided on one side of liquid crystal LQ in the third direction Z, and a counter substrate 32 is provided on the other side thereof. The fourth polarization layer 41 is provided on one surface side of the pixel substrate 31. The fifth polarization layer 42 is provided on the other surface side of the counter substrate 32. Hereinafter, the phrase "panel DP" means part of the configuration of the display panel 30 other than the fourth polarization layer 41 and the fifth polarization layer 42.

For example, a common electrode CE, an insulating layer 33, pixel electrodes P, and an insulating layer 34 are stacked on the other surface of the pixel substrate 31 from the one side in the third direction Z toward the other side. For example, a color filter 35 is stacked on one surface of the counter substrate 32. A seal 36 is interposed between the insulating layer 34 and the color filter 35 outside the display region AA. The seal 36 has the same shape as the seal 25 described above. The liquid crystal LQ is surrounded by the seal 36 between the insulating layer 34 and the color filter 35, and thus, enclosed in the display panel 30.

The display region AA is a region in which a plurality of pixel electrodes P are disposed in the display panel 30. The pixel electrodes P are two-dimensionally arranged along an X-Y plane in the display region AA. The display panel 30 is a display panel of what is called an active matrix type, which is provided to be able to display and output any desired image by individually controlling the transmission degree of light at each pixel electrode P. More specifically, in the display panel 30 of the embodiment, potential as a reference is provided to the common electrode CE. Individual potentials (pixel signals) are provided to the pixel electrodes P, and accordingly, the transmission degrees of light at the pixel electrodes P are individually controlled. Thus, the display region AA is a region in which an image is displayed and output.

The retardation generation layers 51 and 52 are optical members each of which causes optical retardation of light entering from the one side in the third direction Z and transmit the light to the other side in the third direction Z. The retardation generation layers 51 and 52 of the embodiment are what is called ½ wave plates.

The light source 60 emits light toward the other surface side where a polarization generation layer 53 is provided. The polarization generation layer 53 is an optical member that converts light emitted from the other surface of the light source 60 into polarized light at a specific angle. The polarization generation layer 53 is, for example, a dual brightness enhancement film (DBEF) but not limited thereto and only needs to be a component that can convert light emitted from the other surface of the light source 60 into polarized light at the specific angle. Light emitted by the light source 60 is exited from the other surface side of the display device 1 through the polarization generation layer 53, the light adjuster 10, the fourth polarization layer 41, the display panel 30, and the fifth polarization layer 42.

Figure 3:
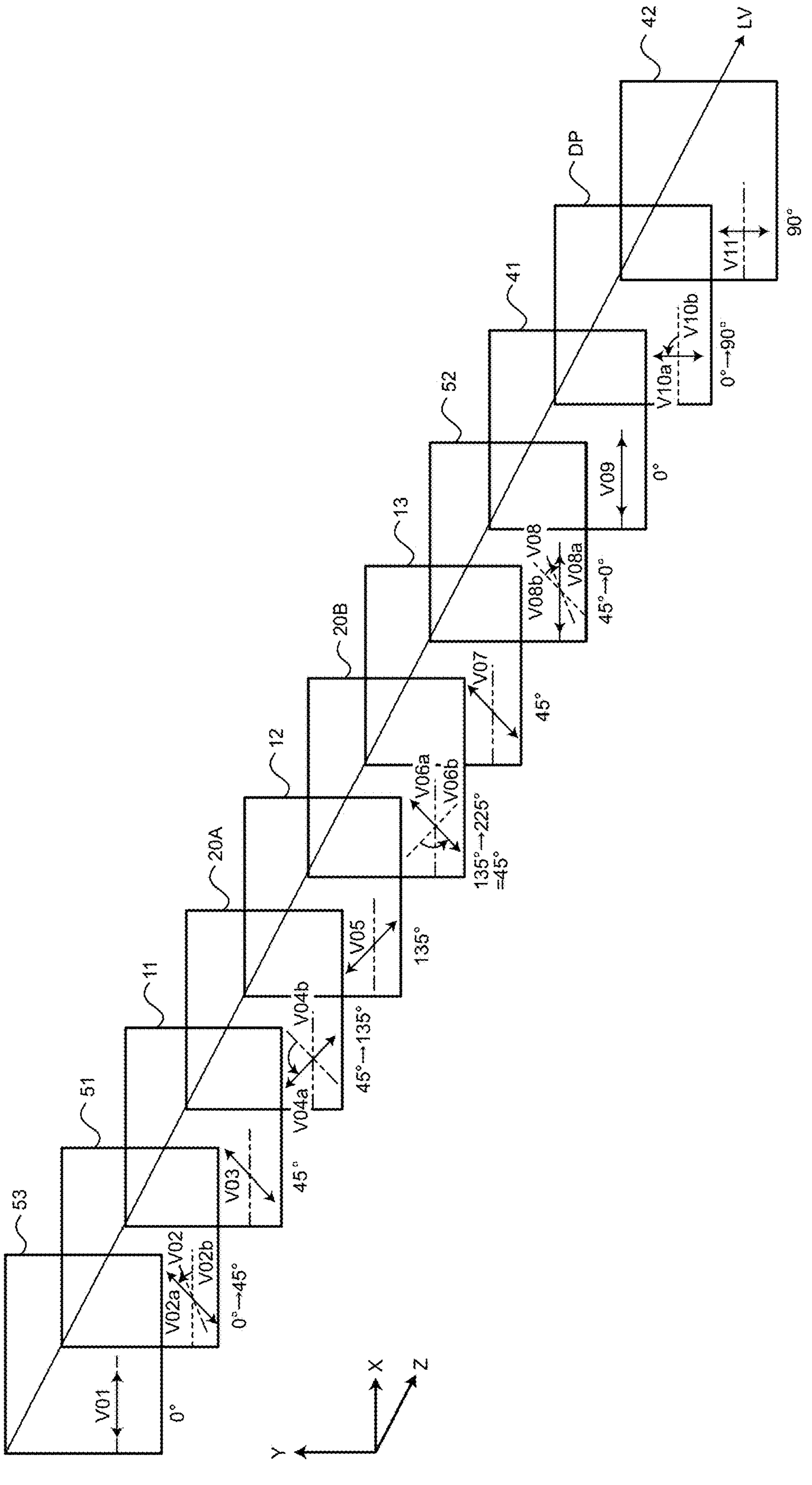
FIG. 3 is a diagram illustrating changes in the polarization direction of light from when the light is emitted by a light source to when the light is exited from the other surface side of the display device.

The following describes changes in the polarization direction of light from when light is emitted by the light source 60 to when the light is exited from the other surface side of the display device 1, with reference to FIG. 3.

FIG. 3 is a diagram illustrating changes in the polarization direction of light from when light is emitted by the light source 60 to when the light is exited from the other surface side of the display device 1. In the following description, polarized light in the first direction X is defined as polarized light at 0°. In description with reference to FIG. 3, the angle of polarization is expressed in a minor angle smaller than 180° with respect to the polarized light at 0°. Also in description with reference to FIG. 3, of the changes in the polarization direction of light, a change with anticlockwise rotation by r° along an X-Y plane is referred to as a "change of +r°", and a change with opposite (clockwise) rotation by r° is referred to as a "change of −r°". The variable r is a real number equal to or larger than zero.

In the embodiment, a polarization axis direction V01 of the polarization generation layer 53 is set so that light emitted from the other surface of the light source 60 is converted into polarized light at 0° and transmitted. Thus, polarized light having passed through the polarization generation layer 53 and incident on the retardation generation layer 51 is polarized light at 0°.

The retardation generation layer 51 is a ½ wave plate as described above. The retardation generation layer 51 of the embodiment causes change in the anticlockwise (+) direction. A slow axis direction V02 of the retardation generation layer 51 is set so as to be at +22.5° relative to the polarized light (0°) passing through the polarization generation layer 53. Accordingly, polarized light undergoes a change of +45° while passing through the retardation generation layer 51. Thus, polarized light having passed through the retardation generation layer 51 and incident on the first polarization layer 11 is polarized light at 45°. FIG. 3 illustrates an angle V02*b* of the polarized light incident on the retardation generation layer 51 and an angle V02*a* of the polarized light having passed through the retardation generation layer 51.

A transmission axis direction V03 of the first polarization layer 11 is set to allow maximum transmission of polarized light at 45°. Thus, light having passed through the retardation generation layer 51 can pass through the first polarization layer 11. Polarized light having passed through the first polarization layer 11 and incident on the first liquid crystal panel 20A is polarized light at 45°.

The liquid crystal panel 20 is provided to apply a change of +90° to polarized light passing therethrough from the one side in the third direction Z to the other side. In other words, the polarized light undergoes the change of +90° while passing through the first liquid crystal panel 20A. Thus, polarized light having passed through the first liquid crystal panel 20A and incident on the second polarization layer 12 is polarized light at 135°. FIG. 3 illustrates an angle V04*b* of polarized light incident on the first liquid crystal panel 20A and an angle V04*a* of polarized light having passed through the first liquid crystal panel 20A.

A transmission axis direction V05 of the second polarization layer 12 is set to allow maximum transmission of polarized light at 135°. Thus, light having passed through the first liquid crystal panel 20A can pass through the second polarization layer 12. Polarized light having passed through the second polarization layer 12 and incident on the second liquid crystal panel 20B is polarized light at 135°.

Polarized light undergoes the change of +90° while passing through the second liquid crystal panel 20B. Thus, polarized light having passed through the second liquid crystal panel 20B and incident on the third polarization layer 13 is polarized light at 225°, which is the same as polarized light at 45°. FIG. 3 illustrates an angle V06*b* of polarized light incident on the second liquid crystal panel 20B and an angle V06*a* of polarized light having passed through the second liquid crystal panel 20B.

A transmission axis direction V07 of the third polarization layer 13 is set to allow maximum transmission of polarized light at 45°. Thus, light having passed through the second liquid crystal panel 20B can pass through the third polarization layer 13. Polarized light having passed through the third polarization layer 13 and incident on the retardation generation layer 52 is polarized light at 45°.

The retardation generation layer 52 is a ½ wave plate as described above. The retardation generation layer 52 of the embodiment causes a change in the clockwise (−) direction. A slow axis direction V08 of the retardation generation layer 52 is set so as to be at −22.5° relative to polarized light (45°) passing through the polarization generation layer 53. Accordingly, polarized light undergoes a change of −45° while passing through the retardation generation layer 52. Thus, polarized light having passed through the retardation generation layer 52 and incident on the fourth polarization layer 41 is polarized light at 0°. FIG. 3 illustrates an angle V08*b* of polarized light incident on the retardation generation layer 52 and an angle V08*a* of polarized light having passed through the retardation generation layer 52.

A transmission axis direction V09 of the fourth polarization layer 41 is set to allow maximum transmission of polarized light at 0°. Thus, light having passed through the retardation generation layer 52 can pass through the fourth polarization layer 41. Polarized light having passed through the fourth polarization layer 41 and incident on the panel DP is polarized light at 0°.

The panel DP is provided to apply a change of +90° to polarized light passing therethrough from the one side in the third direction Z to the other side. In other words, polarized light undergoes the change of +90° while passing through the panel DP. Thus, polarized light having passed through the panel DP and incident on the fifth polarization layer 42 is polarized light at 90°. FIG. 3 illustrates an angle V10*b* of polarized light incident on the panel DP and an angle V10*a* of polarized light having passed through the panel DP.

A transmission axis direction V11 of the fifth polarization layer 42 is set to allow maximum transmission of polarized light at 90°. Thus, light having passed through the panel DP can pass through the fifth polarization layer 42. In this manner, a transmission path LV of light from the light source 60 to the other surface side of the fifth polarization layer 42 is formed.

The liquid crystal panel 20 will be more specifically described below with reference to FIGS. 4 to 7.

Figure 4:
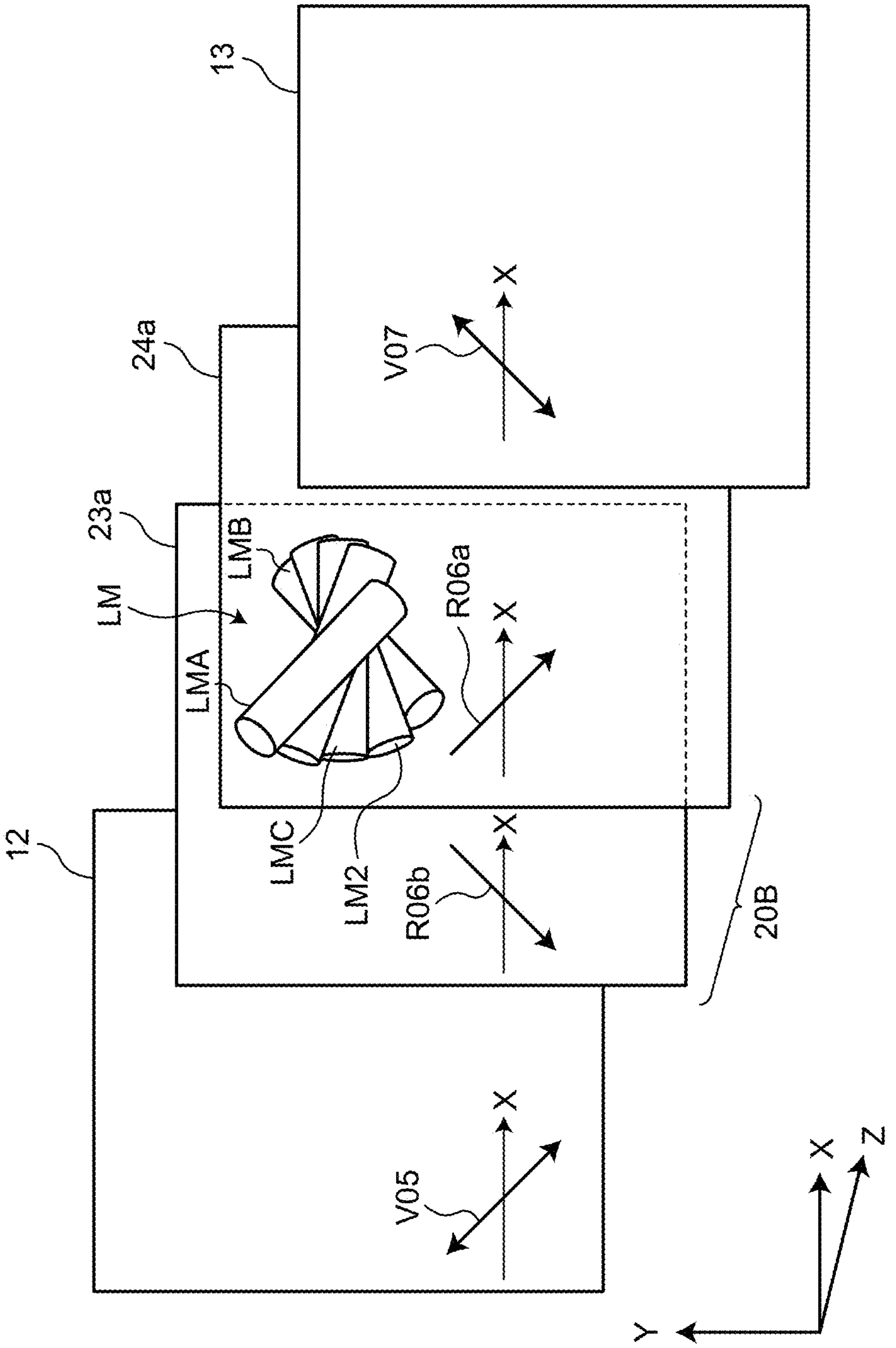
FIG. 4 is a diagram illustrating the relation of rubbing directions R06*a* and R06*b* of respective alignment films included in a second liquid crystal panel with transmission axis directions of a second polarization layer and a third polarization layer disposed facing in a third direction with the second liquid crystal panel interposed therebetween.

FIG. 4 is a diagram illustrating the relation of rubbing directions R06*a* and R06*b* of the respective alignment films 23*a* and 24*a* included in the second liquid crystal panel 20B with the transmission axis directions of the second polarization layer 12 and the third polarization layer 13 disposed facing each other in the third direction Z with the second liquid crystal panel 20B interposed therebetween. In description with reference to FIG. 4 and FIG. 7 to be described later, a direction toward one side in the first direction X (the right side in FIG. 4) is defined as a direction at 0°. A direction having an angle formed anticlockwise relative to the direction at 0° is defined as a direction at a positive (+) angle (°), and a direction having an angle formed clockwise is defined as a direction at a negative (−) angle) (°).

The alignment films 23*a* and 24*a* are each provided with rubbing treatment on a contacting surface side with the liquid crystal LM to align the orientation of each liquid crystal molecule with a particular direction. The particular direction provided by the rubbing treatment is a rubbing direction. The rubbing direction R06*b* of the alignment film 23*a* is at 225° (−135°). The rubbing direction R06*a* of the alignment film 24*a* is at 315° (−45°).

The alignment film 23*a* is stacked on the other surface of the first substrate 21 in the second liquid crystal panel 20B, and the second polarization layer 12 faces one surface of the first substrate 21. As illustrated in FIGS. 3 and 4, a transmission axis direction V05 of the second polarization layer 12 is at 135°. Accordingly, the rubbing direction R06*b* of the alignment film 23*a* and the transmission axis direction V05 of the second polarization layer 12 are orthogonal to each other.

The alignment film 24*a* is stacked on one surface of the second substrate 22 in the second liquid crystal panel 20B, and the third polarization layer 13 faces the other surface of the second substrate 22. As illustrated in FIGS. 3 and 4, a transmission axis direction V07 of the third polarization layer 13 is at 45°. Accordingly, the rubbing direction R06*a* of the alignment film 24*a* and the transmission axis direction V07 of the third polarization layer 13 are orthogonal to each other.

As described above with reference to FIG. 4, in the second liquid crystal panel 20B of the embodiment, the rubbing direction of an alignment film stacked on a substrate and the orientation axis of a polarization layer contacting the substrate are orthogonal to each other. In other words, the second liquid crystal panel 20B is provided as what is called an O-mode liquid crystal panel.

As described above, the first liquid crystal panel 20A and the second liquid crystal panel 20B have the same configuration of a liquid crystal panel (the liquid crystal panel 20). Accordingly, the rubbing direction R06*b* of the alignment film 23*a* on one surface side of the first liquid crystal panel 20A is at 225° (−135°) as in the second liquid crystal panel 20B. A transmission axis direction V03 of the first polarization layer 11 disposed on the one surface side of the first liquid crystal panel 20A is at 45°. The rubbing direction R06*a* of the alignment film 24*a* on the other surface side of the first liquid crystal panel 20A is 315° (−45°) as in the second liquid crystal panel 20B. The transmission axis direction V05 of the second polarization layer 12 disposed on the other surface side of the first liquid crystal panel 20A is at 135°. Accordingly, in the first liquid crystal panel 20A of the embodiment, the rubbing direction of an alignment film stacked on a substrate and the orientation axis of a polarization layer contacting the substrate are parallel to each other. In other words, the first liquid crystal panel 20A is provided as what is called an E-mode liquid crystal panel.

More specifically, the shape of each liquid crystal molecule contained in the liquid crystal LM can be regarded as a prolate spheroid. The long axis direction of the prolate spheroid is defined as an "ne ($n_{extraordinary}$) axis". The short axis direction of the prolate spheroid orthogonal to the ne axis is defined as an "no ($n_{ordinary}$) axis". In the E mode, the rubbing direction of the alignment film 23*a* is set so that the transmission axis direction of the polarization layer facing the alignment film 23*a* with the first substrate 21 interposed therebetween is aligned with the ne axis, and the rubbing direction of the alignment film 24*a* is set so that the transmission axis direction of the polarization layer facing the alignment film 24*a* with the second substrate 22 interposed therebetween is aligned with the ne axis. In the O mode, the rubbing direction of the alignment film 23*a* is set so that the transmission axis direction of the polarization layer facing the alignment film 23*a* with the first substrate 21 interposed therebetween is aligned with the no axis, and the rubbing direction of the alignment film 24*a* is set so that the transmission axis direction of the polarization layer facing the alignment film 24*a* with the second substrate 22 interposed therebetween is aligned with the no axis.

A rubbing direction does not limit polarized light passing therethrough. In other words, the alignment films 23*a* and 24*a* transmit light irrespective of their rubbing directions.

Figure 5:
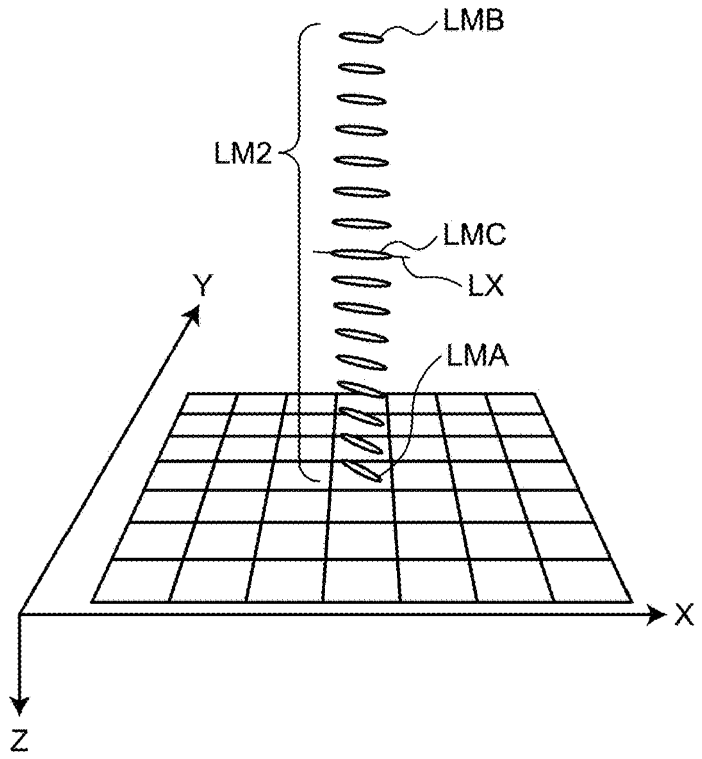
FIG. 5 is a diagram illustrating the orientations of liquid crystal molecules when a liquid crystal panel is not in operation (OFF)
Figure 6:
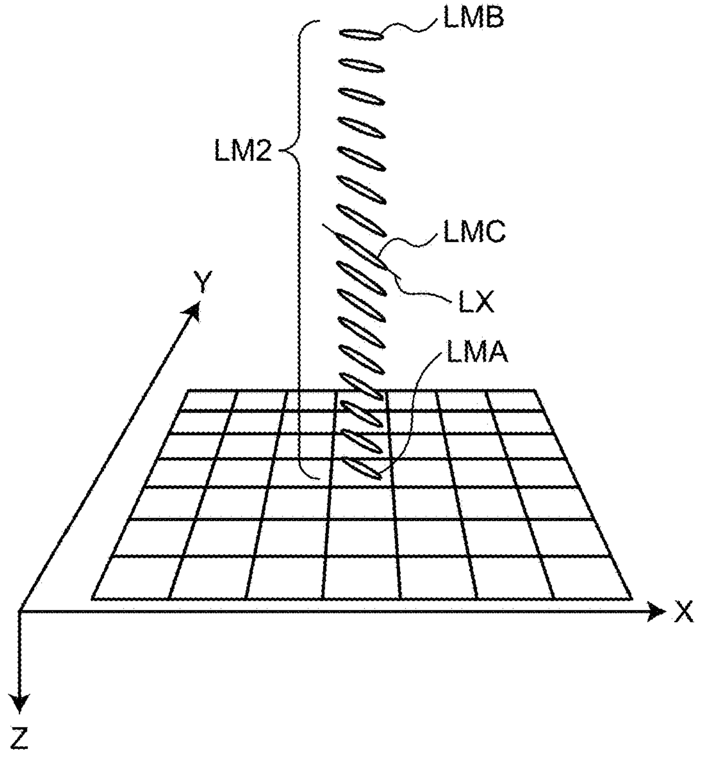
FIG. 6 is a diagram illustrating the orientations of liquid crystal molecules when a liquid crystal panel is in operation (ON)

The rubbing directions of the alignment films 23*a* and 24*a* affect the orientations of liquid crystal molecules contained in the liquid crystal LM. In FIG. 4 and FIGS. 5 and 6 to be described later, liquid crystal molecules LM2 are illustrated as liquid crystal molecules contained in the liquid crystal LM. Among the liquid crystal molecules LM2, a liquid crystal molecule positioned on the alignment film 23*a* side and oriented in the rubbing direction R06*b* is specially illustrated as a liquid crystal molecule LMB. Among the liquid crystal molecules LM2, a liquid crystal molecule positioned on the alignment film 24*a* side and oriented in the rubbing direction R06*a* is specially illustrated as a liquid crystal molecule LMA. Among the liquid crystal molecules LM2, a liquid crystal molecule at an approximately intermediate position between the liquid crystal molecule LMA and the liquid crystal molecule LMB in the third direction Z is specially illustrated as a liquid crystal molecule LMC.

As illustrated in FIG. 4, among the liquid crystal molecules LM2, those closer to the alignment film 23*a* are oriented in directions closer to the rubbing direction R06*b*, and those closer to the alignment film 24*a* are oriented in directions closer to the rubbing direction R06*a* when viewed at a viewpoint of viewing an X-Y plane from the front. With such continuity of change in liquid crystal molecule orientation across the liquid crystal molecules LM2 arranged in the third direction Z, the liquid crystal panel 20 applies the change of +90° to polarized light passing therethrough from the one side in the third direction Z to the other side.

FIG. 5 is a diagram illustrating the orientations of the liquid crystal molecules LM2 when the liquid crystal panel 20 is not in operation (OFF). FIG. 6 is a diagram illustrating the orientations of the liquid crystal molecules LM2 when the liquid crystal panel 20 is in operation (ON). As described above, the liquid crystal panel 20 is a liquid crystal panel of the TN type. Accordingly, when the liquid crystal panel 20 is not in operation (OFF), a long axis direction LX of each liquid crystal molecule LM2 is substantially aligned with an X-Y plane as illustrated in FIG. 5. When the liquid crystal panel 20 is in operation (ON), the orientation of each liquid crystal molecule LM2 changes in accordance with the potential difference between the first electrode FE1 and the second electrode FE2 (refer to FIG. 2) so that the long axis direction LX is closer to the third direction Z. Accordingly, when the liquid crystal panel 20 is in operation (ON), the long axis direction LX of each liquid crystal molecule LM2 intersects an X-Y plane as illustrated in FIG. 6.

When the liquid crystal panel 20 is not in operation (OFF) as described above with reference to FIG. 5, the transmission degree of light on one side in the first direction X is hardly different from that on the other side in the first direction X. Specifically, when the first liquid crystal panel 20A and the second liquid crystal panel 20B are both not in operation (OFF) and an image DSP (refer to FIG. 9) on the display device 1 is viewed from each of two viewpoints that are line symmetric in the first direction X with respect to a viewpoint of viewing the display device 1 from the front, the brightnesses of the image recognized at the two viewpoints are substantially equal to each other. Hereinafter, the phrase "image DSP" means an image displayed and output by the display panel 30 of the display device 1. In this case, at a viewpoint of viewing the display device 1 from the front, the image can be viewed with a brightness equal to or higher than brightnesses at other viewpoints. In other words, when the liquid crystal panel 20 is not in operation (OFF), the transmission degree of light along the third direction Z through the liquid crystal panel 20 is equal to or larger than the transmission degree of light intersecting the third direction Z through the liquid crystal panel 20.

When the liquid crystal panel 20 is in operation (ON) as described above with reference to FIG. 6, the transmission degree of light on the one side in the first direction X is different from that on the other side in the first direction X. The following describes a view angle characteristic of the display device 1 that is obtained in accordance with the transmission degree of light when the liquid crystal panel 20 is in operation (ON), with reference to FIG. 7.

Figure 7:
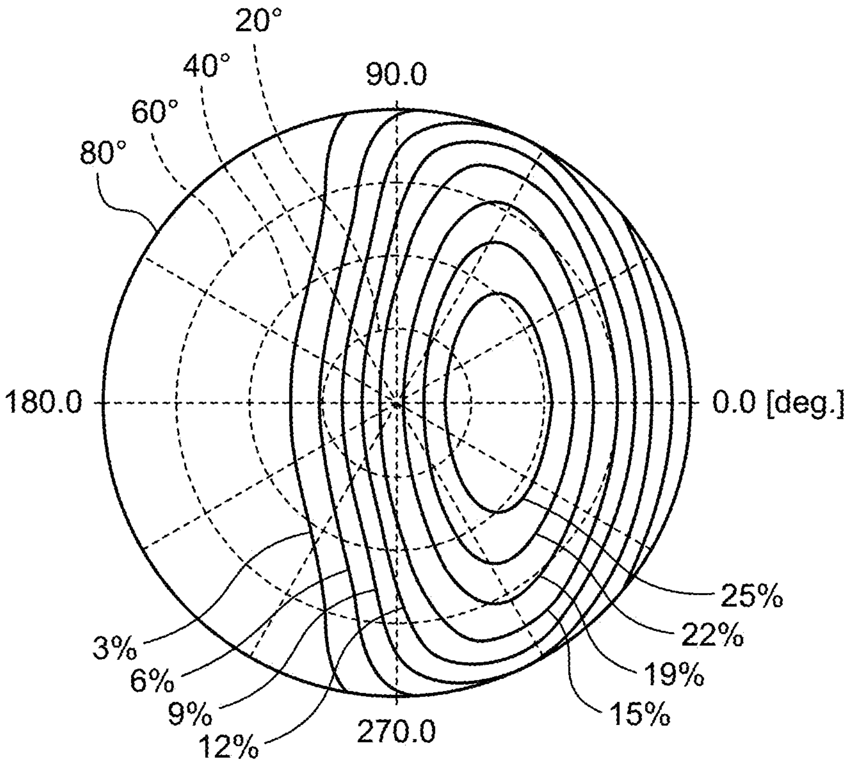
FIG. 7 is a diagram illustrating an exemplary view angle characteristic of the display device that is obtained in accordance with the transmission degree of light when a liquid crystal panel is in operation (ON)

FIG. 7 is a diagram illustrating an exemplary view angle characteristic of the display device 1 that is obtained in accordance with the transmission degree of light when the liquid crystal panel 20 is in operation (ON). The center of concentric circles in FIG. 7 corresponds to the normal of the display device 1 in the third direction Z, and the concentric circles centered at the normal indicate tilt angles of 20°, 40°, 60°, and 80°, respectively, with respect to the normal. This illustrated characteristic diagram is obtained by connecting regions of transmittances in respective directions that are equal to each other.

As illustrated in FIG. 7, relatively high transmittance of light is obtained when user's line of sight toward the display device 1 is tilted toward one side (0°) in the first direction X. Relatively high transmittance of light is also obtained when user's line of sight toward the display device 1 is aligned with the normal direction, in other words, when the user views the display device 1 from the front. However, when user's line of sight toward the display device 1 is tilted toward the other side (180°) in the first direction X, the transmittance of light significantly decreases as compared to the case of tilt toward the one side. In particular, when the tilt angle of the line of sight toward the other side (180°) in the first direction X is exceeds 30°, the transmittance is 3% or lower in the example illustrated in FIG. 7 and the brightness is so low that the image substantially cannot be viewed by a human.

The view angle characteristic described above with reference to FIG. 7 can be utilized for display output control intended to enable a user viewing the display device 1 from the front or viewing the display device 1 from the one side in the first direction X to view the image but not to enable a user viewing the display device 1 from the other side in the first direction X to view the image. An example in which such a display output control is applied will be described below with reference to FIG. 8.

Figure 8:
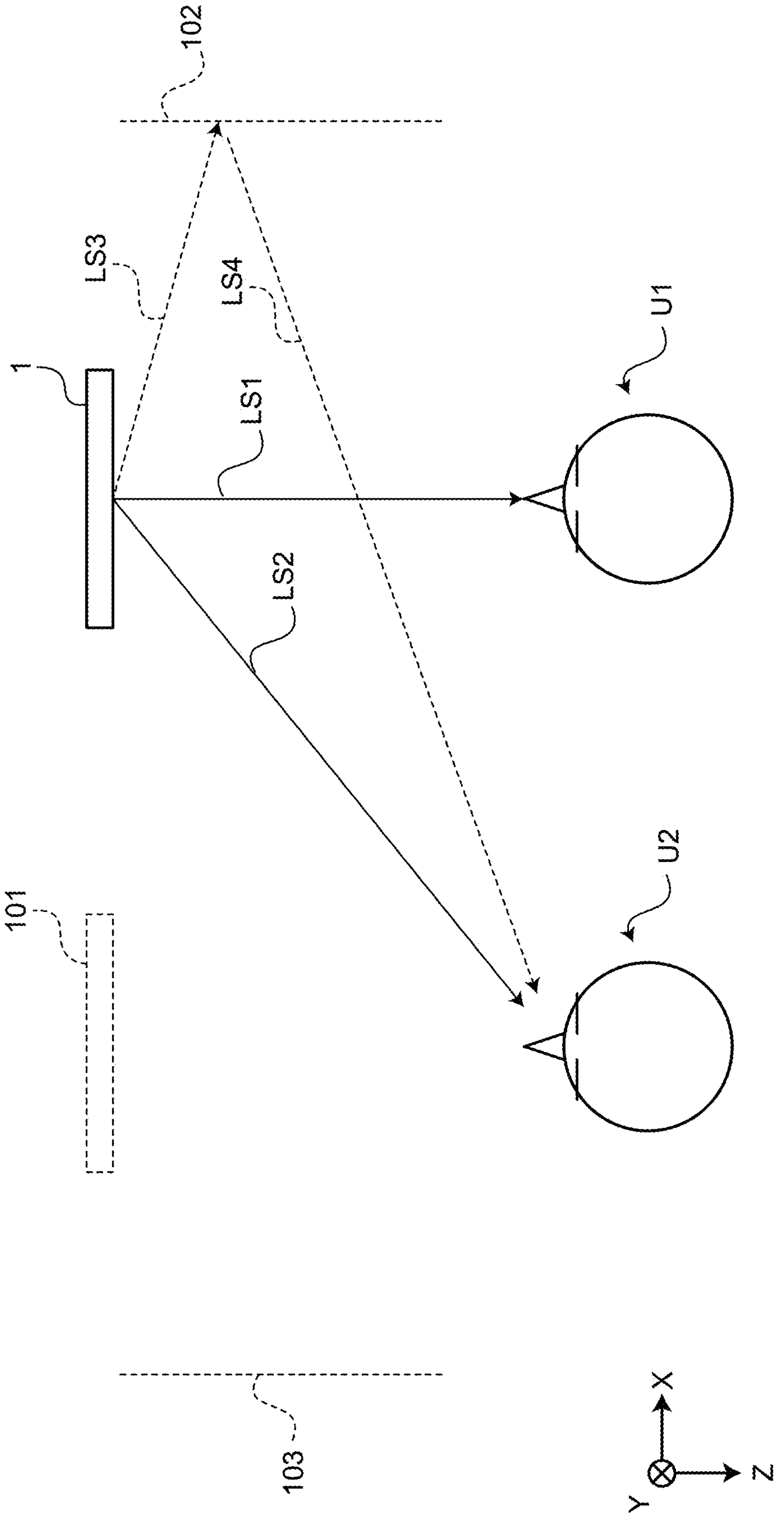
FIG. 8 is a schematic diagram illustrating an example of the relation between the display device, a user who can view an image regardless of whether each liquid crystal panel is in operation or not in operation (ON or OFF), and a user who cannot view the image when each liquid crystal panel is in operation (ON)

FIG. 8 is a schematic diagram illustrating an example of the relation between the display device 1, a user U1 who can view the image DSP regardless of whether each liquid crystal panel 20 is in operation or not in operation (ON or OFF), and a user U2 who cannot view the image DSP when each liquid crystal panel 20 is in operation (ON).

As illustrated in FIG. 8, the display device 1 and the user U1 face each other in the third direction Z. Although not illustrated in FIG. 8, the other surface side of the display device 1, in other words, the fifth polarization layer 42 side is the user U1 side in FIG. 8. Thus, in display output by the display device 1, light LS1 of the image toward the user U1 is along the third direction Z. In such a positional relation the display device 1 and the user U1, it can be expressed that the user U1 is located at a viewpoint of viewing the display device 1 from the front. The user U2 is located at a position of obliquely viewing the other surface side of the display device 1 in a direction tilted toward the other side in the first direction X relative to the third direction Z. In other words, in display output by the display device 1, light LS2 of the image toward the user U2 is tilted toward the other side (180° in FIG. 7) in the first direction X. In such a positional relation the display device 1 and the user U2, it can be expressed that the user U2 is located at a viewpoint of obliquely viewing the display device 1.

A case where the positional relation between the display device 1 and the users U1 and U2 as illustrated in FIG. 8 is established is, for example, a case where the display device 1 is provided in a four-wheel automobile in which the user U2 is seated on the driver seat and the user U1 is seated on the front passenger seat, but is not limited thereto. The positional relation can be established, for example, in a case where the display device 1 is provided as a personal monitor for each passenger on an aircraft such as a passenger airplane, and any other case may be included.

Figure 9:
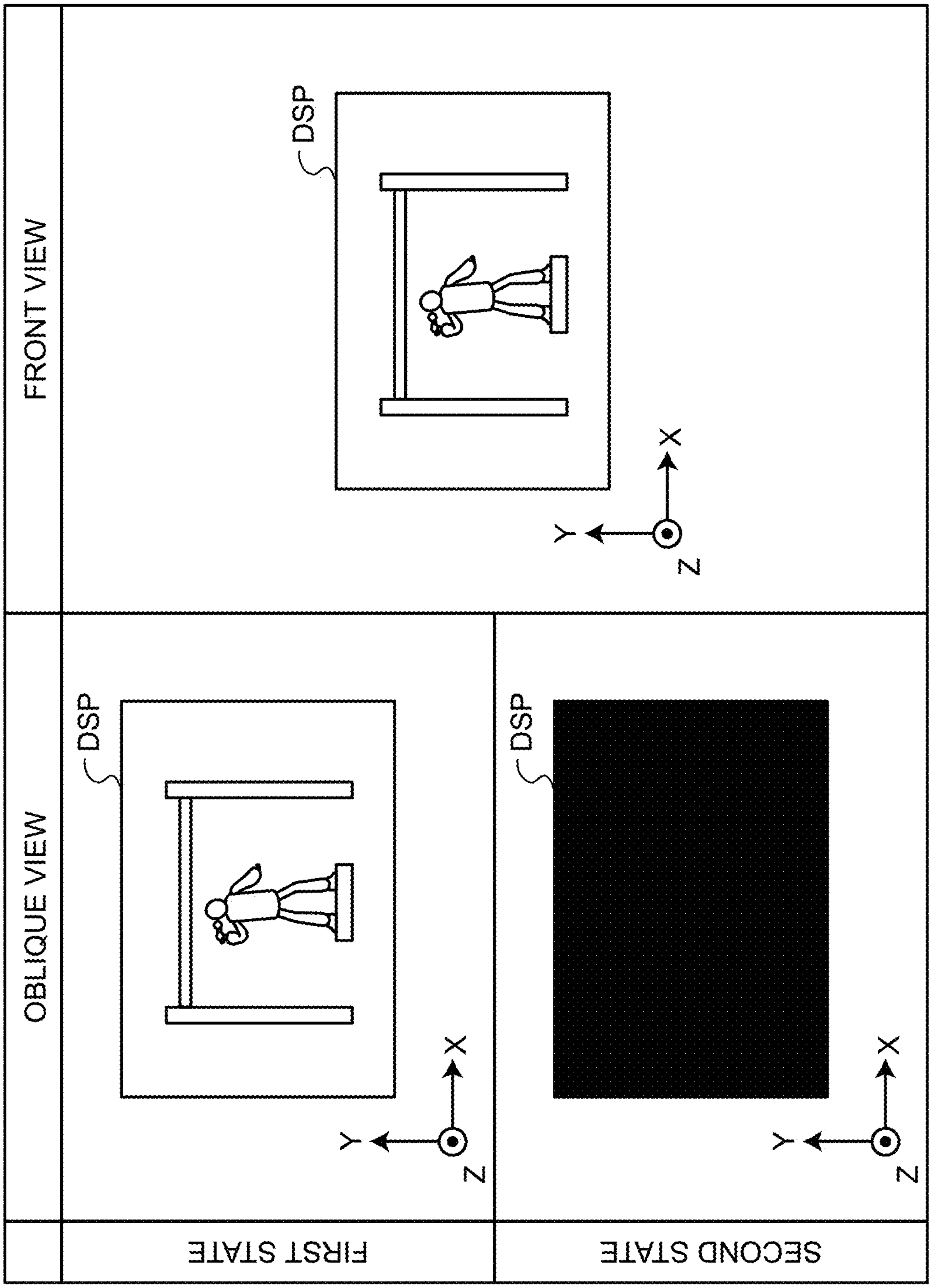
FIG. 9 is a schematic view illustrating a difference in the images viewed by a user viewing the display device from the front and a user obliquely viewing the display device.

FIG. 9 is a schematic view illustrating a difference in the image DSP viewed by a user viewing the display device 1 from the front and a user obliquely viewing the display device 1. The user viewing the display device 1 from the front is, for example, the user U1 in FIG. 8. The user obliquely views the display device 1 is, for example, the user U2 in FIG. 8. In description with reference to FIG. 9, a state of the display device 1 in which the display panel 30 performs the image display and the liquid crystal panel 20 is not in operation (OFF) is referred to as a first state. A state of the display device 1 in which the display panel 30 performs the image display and the liquid crystal panel 20 is in operation (ON) is referred to as a second state.

As described above, a degree that light along the third direction Z passes through the liquid crystal panel 20 when the liquid crystal panel 20 is not in operation (OFF) is equal to or larger than a degree that light intersecting the third direction Z passes through the liquid crystal panel 20. As described above with reference to FIG. 7, when a user views the display device 1 from the front, relatively high transmittance of light is obtained even while the liquid crystal panel 20 is in operation (ON). Thus, a user viewing the display device 1 from the front can view the image DSP illustrated in FIG. 9 irrespective of whether the operation state of the display device 1 is the first state or the second state. The aspect of the image DSP illustrated in FIG. 9 is merely exemplary and the present disclosure is not limited thereto. The display panel 30 may display and output any desired image.

As described above with reference to FIG. 7, when user's line of sight toward the display device 1 is tilted toward the other side (180°) in the first direction X while the liquid crystal panel 20 is in operation (ON), transmittance of light significantly decreases as compared to the case of tilt toward the one side. Thus, a user obliquely viewing the display device 1 from the other side in the first direction X substantially cannot view the image DSP when the operation state of the display device 1 is the second state. However, when the operation state of the display device 1 is the first state, such significant decrease in the transmittance of light as described above with reference to FIG. 7 does not occur even for the other side (180°) in the first direction X. Thus, when the operation state of the display device 1 is in the first state, a user obliquely viewing the display device 1 from the other side in the first direction X can view substantially the same image DSP as that for a user viewing the display device 1 from the front.

As illustrated in FIG. 9, the image DSP is viewed as a rectangular image. Accordingly, the display region AA has a rectangular shape corresponding to the image DSP illustrated in FIG. 9 when the display device 1 is viewed from the front. Two sides of the four sides of the rectangle extend along the first direction X, and the other two sides extend along the second direction Y. The light adjuster 10 of the embodiment causes the transmission degree of light along a line tilted toward one side in the longitudinal direction of the rectangle (the first direction X) with respect to the third direction Z and the transmission degree of light along a line tilted toward the other side in the longitudinal direction to be different from each other. Accordingly, the light adjuster 10 generates the difference in viewing between the first and second states described above with reference to FIG. 9.

As described above, the light adjuster 10 includes the first liquid crystal panel 20A provided as an E-mode liquid crystal panel and the second liquid crystal panel 20B provided as an O-mode liquid crystal panel. Optical characteristics attributable to mixture of the E-mode liquid crystal panel and the O-mode liquid crystal panel will be described below with reference to FIGS. 10 to 12.

Figure 10:
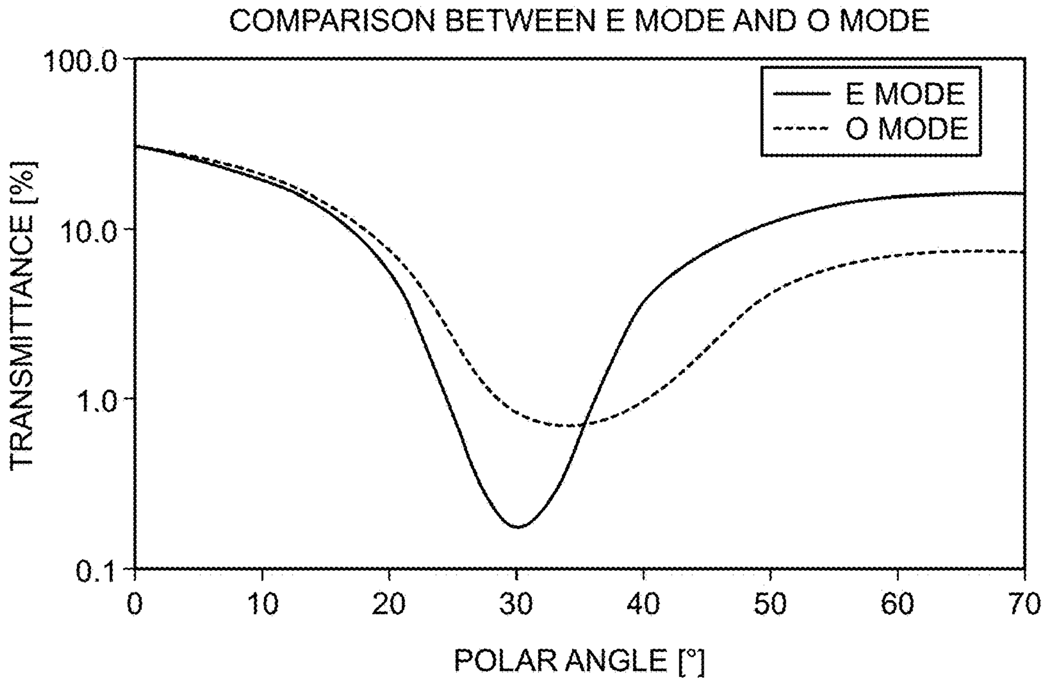
FIG. 10 is a graph illustrating the relation between a polar angle and the transmittance of light when an E-mode or O-mode liquid crystal panel is in operation (ON)

FIG. 10 is a graph illustrating the relation between a polar angle and the transmittance of light when the E-mode or O-mode liquid crystal panel 20 is in operation (ON). The horizontal axis (polar angle) in FIG. 10 and FIG. 14 to be described later represents the angle between the line of light tilted toward the other side in the first direction X (180.0 side in FIG. 7) in the description with reference to FIG. 7 and a reference (0°) that is an angle aligned with the third direction Z. The vertical axis (transmittance) represents the transmittance of light along a line corresponding to the polar angle represented by the horizontal axis.

As illustrated in FIG. 10, the relation between the polar angle and the transmittance of light when the liquid crystal panel 20 is in operation (ON) is different between the liquid crystal panel 20 (for example, the first liquid crystal panel 20A) provided as an E-mode liquid crystal panel and the liquid crystal panel 20 (for example, the second liquid crystal panel 20B) provided as an O-mode liquid crystal panel. Specifically, the graph illustrating the relation between the polar angle and the transmittance of the liquid crystal panel 20 provided as an E-mode liquid crystal panel has a deep valley shape in which the transmittance significantly decreases to less than 1% with a peak at the polar angle of 30°. However, the graph illustrating the relation between the polar angle and the transmittance of the liquid crystal panel 20 provided as an O-mode liquid crystal panel has a relatively gentle basin shape as compared to the E-mode graph, in which the transmittance is substantially 1% approximately between the polar angle of 30° and the polar angle of 40°.

The difference in optical characteristics between the E and O modes as described above with reference to FIG. 10 can be utilized to achieve a view angle characteristic that is more suitable for prevention of viewing of the image DSP on the display device 1 in the second state from the other side in the first direction X. Specifically, the light adjuster 10 includes one liquid crystal panel 20 (for example, the first liquid crystal panel 20A) provided as an E-mode liquid crystal panel and one liquid crystal panel 20 provided as an O-mode liquid crystal panel (for example, the second liquid crystal panel 20B) as described above with reference to FIGS. 3 and 4. Thus, it is possible to more reliably prevent viewing of the image DSP on the display device 1 in the second state from the other side in the first direction X.

Figure 11:
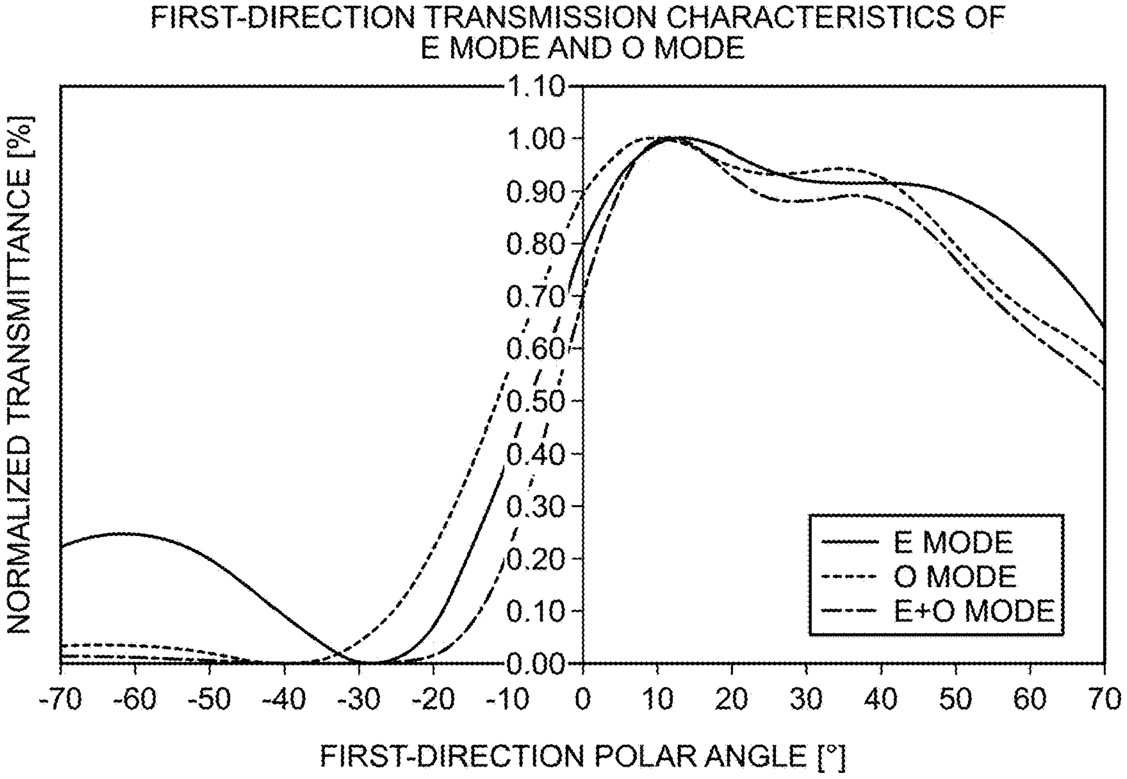
FIG. 11 is a graph illustrating the normalized transmittance of the display device in a second state when the display device includes the E-mode liquid crystal panel only, the O-mode liquid crystal panel only, or a combination of the E-mode liquid crystal panel and the O-mode liquid crystal panel.
Figure 12:
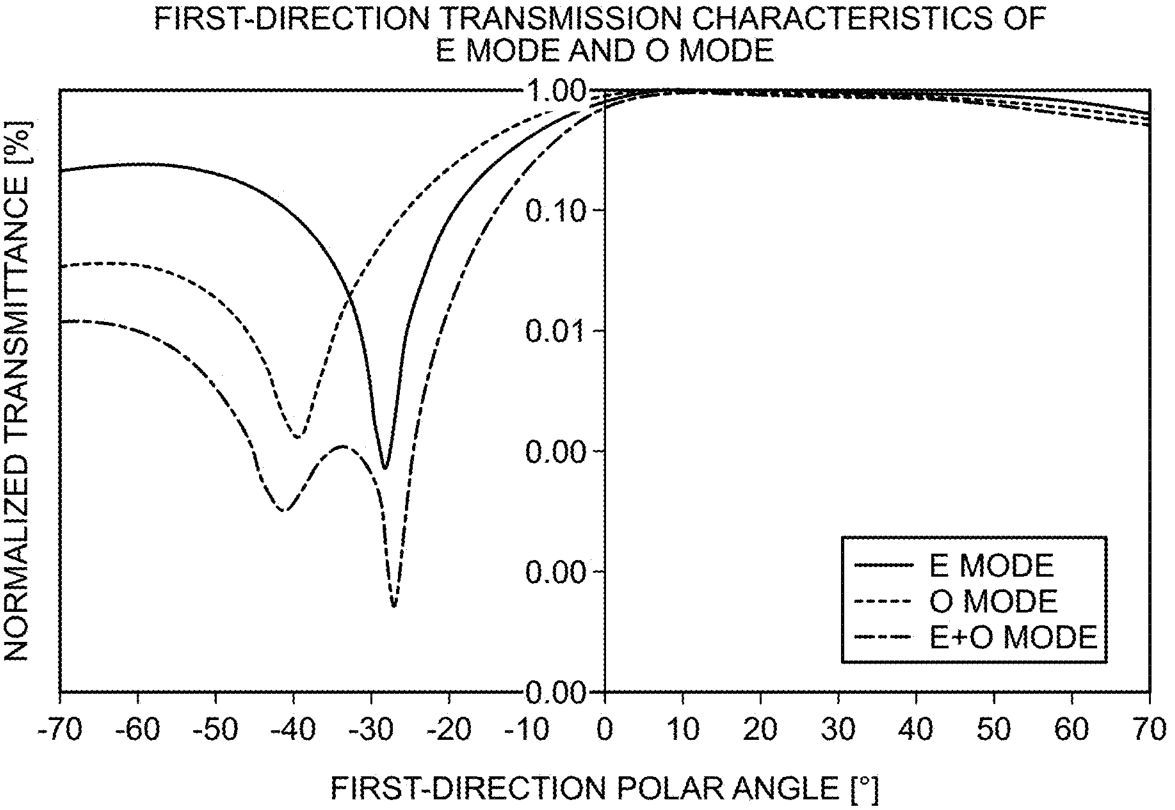
FIG. 12 is a graph illustrating the normalized transmittance of the display device in the second state when the display device includes the E-mode liquid crystal panel only, the O-mode liquid crystal panel only, or the combination of the E-mode liquid crystal panel and the O-mode liquid crystal panel.

FIGS. 11 and 12 are graphs illustrating the normalized transmittance of the display device 1 in the second state when the display device 1 includes the E-mode liquid crystal panel only, the O-mode liquid crystal panel only, or a combination of the E-mode liquid crystal panel and the O-mode liquid crystal panel. "E MODE" illustrates a case of the E-mode liquid crystal panel only, in other words, a configuration in which the light adjuster 10 includes only the E-mode liquid crystal panel. "O MODE" illustrates a case of the O-mode liquid crystal panel only, in other words, a configuration in which the light adjuster 10 includes only the O-mode liquid crystal panel. "E+O MODE" illustrates a case of the combination of the E- and O-mode liquid crystal panels, in other words, a configuration in which the light adjuster 10 includes both the E-mode liquid crystal panel and O-mode liquid crystal panel as in the embodiment.

The normalized transmittance is a value of 0.0 to 1.0, which expresses the brightness of the image DSP that can be viewed by a user. The value of 1.0 is set as the brightness of the image at a view angle at which the image can be viewed brightest when the display device 1 is in operation, and the value of 0.0 is set as the brightness in a state with no light from the light source 60 (when the display device 1 is not in operation).

Figure 15:
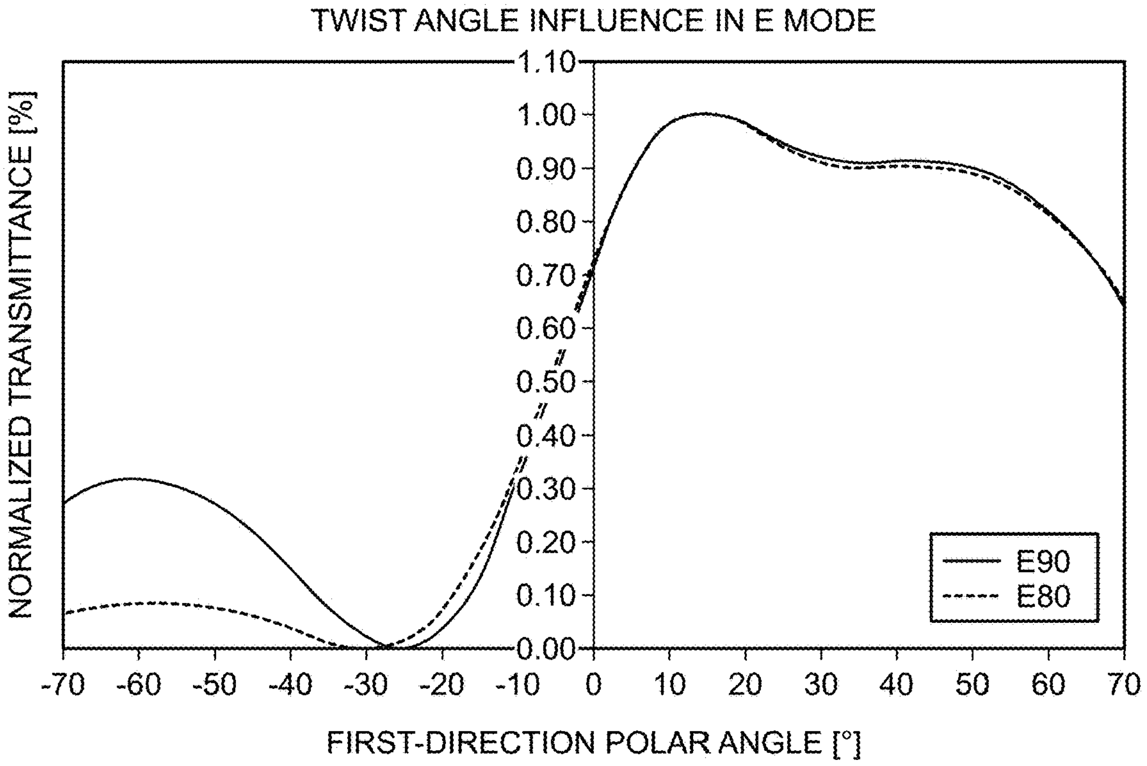
FIG. 15 is a graph illustrating the normalized transmittance on one side and the other side in a first direction when the liquid crystal panel provided as an E-mode liquid crystal panel is in operation (ON) in each of a case where the twist angle is 90° (TWIST 90°) and a case where the twist angle is 80° (TWIST 80°)
Figure 16:
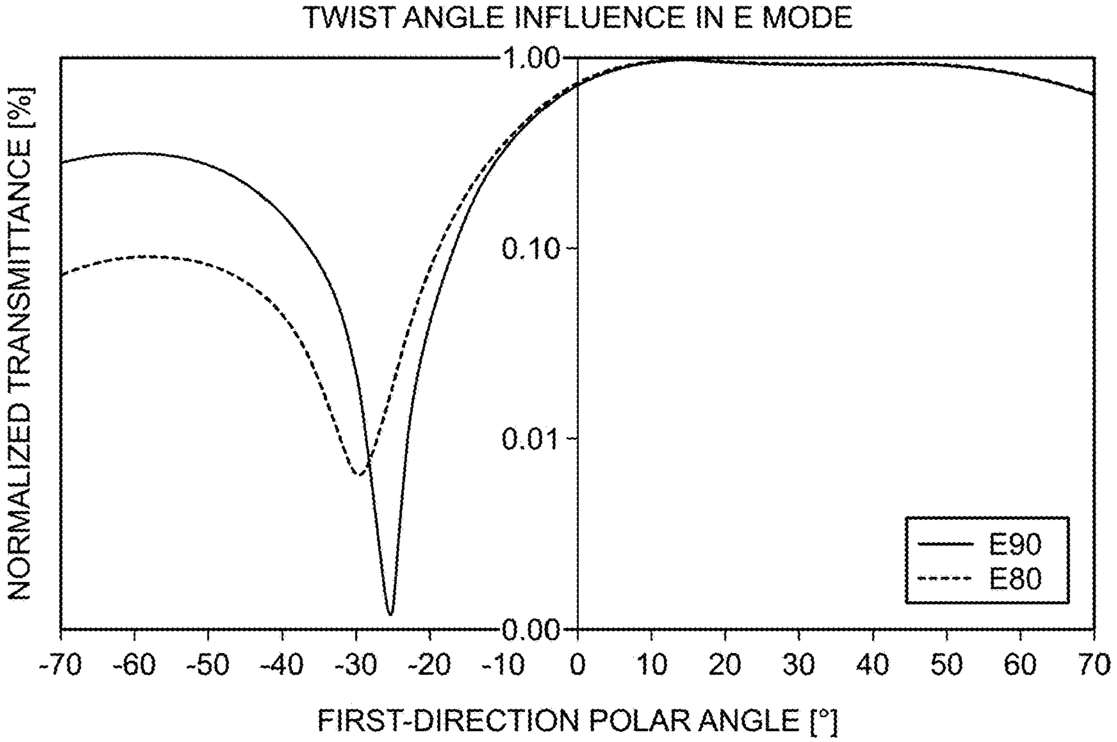
FIG. 16 is a graph illustrating the normalized transmittance on one side and the other side in the first direction when the liquid crystal panel provided as an E-mode liquid crystal panel is in operation (ON) in each of a case where the twist angle is 90° (TWIST 90°) and a case where the twist angle is 80° (TWIST 80°)
Figure 17:
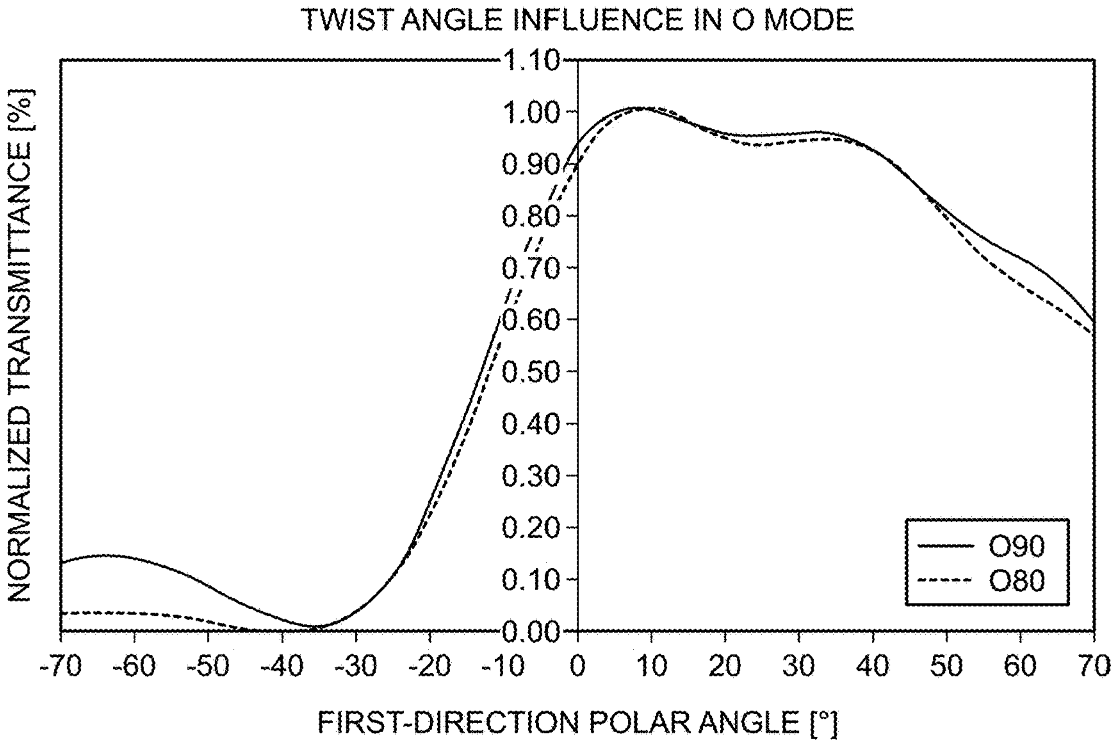
FIG. 17 is a graph illustrating the normalized transmittance on one side and the other side in the first direction when a liquid crystal panel provided as an O-mode liquid crystal panel is in operation (ON) in each of a case where the twist angle is 90° (TWIST 90°) and a case where the twist angle is 80° (TWIST 80°)
Figure 18:
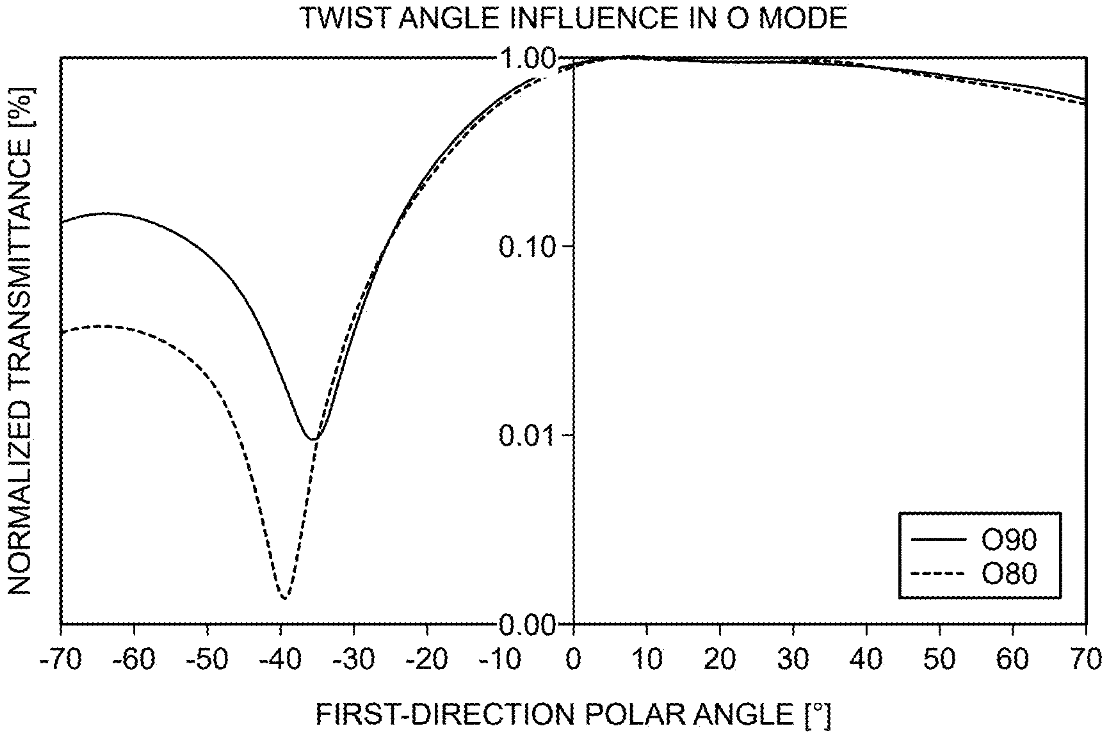
FIG. 18 is a graph illustrating the normalized transmittance on one side and the other side in the first direction when the liquid crystal panel provided as an O-mode liquid crystal panel is in operation (ON) in each of a case where the twist angle is 90° (TWIST 90°) and a case where the twist angle is 80° (TWIST 80°)

In FIG. 11 and FIGS. 15 and 17 to be described later, the normalized transmittance of 0.00 to 1.00 is illustrated at equal intervals in the vertical axis direction. In FIG. 12 and FIGS. 16 and 18 to be described later, the value of the normalized transmittance is 1.0 at the upper end in the vertical axis direction and decreases by 1/10 in each scale in the downward direction. The illustrated relation between the view angle and the normalized transmittance is the same between FIGS. 11 and 12 except that the manner of expression in the vertical axis direction is different therebetween. In the horizontal axis direction in FIGS. 11 and 12 and FIGS. 15 to 18 to be described later, the line of sight at an angle tilted toward the one side in the first direction X with respect to a reference (view angle of) 0° at the line of sight when viewing the display device 1 from the front is regarded as a view angle of a positive (+) value, and the line of sight at an angle tilted toward the other side in the first direction X is regarded as a view angle of a negative (−) value.

In a case of a configuration in which the light adjuster 10 includes only the E-mode liquid crystal panel, the normalized transmittance is extremely close to 0 at the view angle of −30° but is 0.1 or larger at view angles on the positive (+) side of −20° and on the negative (−) side of −40°. In this manner, with the E-mode liquid crystal panel only, there remains the possibility that the image DSP unintentionally can be viewed when obliquely viewed if the view angle is even slightly deviated from −30°.

In a case of a configuration in which the light adjuster 10 includes only the O-mode liquid crystal panel, the normalized transmittance is approximately 0.1 or larger up to −25° approximately even when viewed from the other side in the first direction X. In this manner, with the O-mode liquid crystal panel only, prevention of viewing from the other side in the first direction X is potentially insufficient.

However, in a case of a configuration in which the light adjuster 10 includes both the E-mode and O-mode liquid crystal panels as in the embodiment, the normalized transmittance is significantly smaller than 0.1 when the view angle is on the negative side of −20°. Unlike the case of the E-mode liquid crystal panel only, the normalized transmittance is not 0.1 or larger even when the view angle is on the negative (−) side of −40°. In this manner, according to the embodiment, since the light adjuster 10 includes both the E-mode and O-mode liquid crystal panels, it is possible to more reliably prevent viewing of the image DSP on the display device 1 in the second state from the other side in the first direction X.

In the display device 1, the specific configuration of the display panel 30 that can be combined with the light adjuster 10 of the embodiment is not limited to the above-described liquid crystal panel of the IPS type. The display panel 30 may be a liquid crystal panel of another type as long as it is what is called a transmissive liquid crystal panel and includes a plurality of pixels in each of which the transmission degree of light is individually controllable in accordance with image data input from the outside. The following describes, with reference to FIG. 13, the configuration of pixels provided in a liquid crystal panel of the IPS type, which is employable as the display panel 30 of the embodiment.

Figure 13:
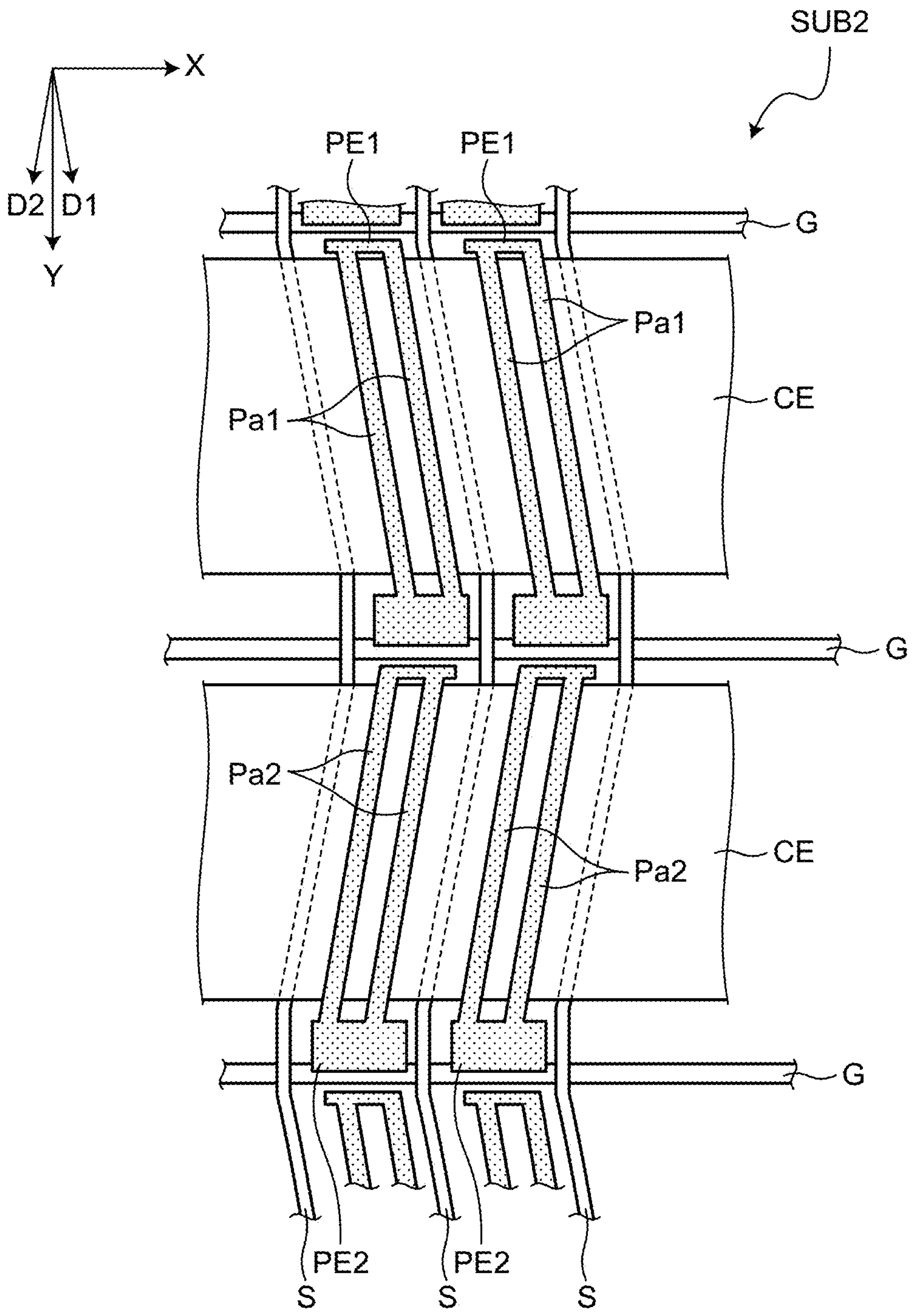
FIG. 13 is a plan view illustrating an example of a pixel arrangement in a display panel.

FIG. 13 is a plan view illustrating an example of a pixel arrangement in the display panel 30. FIG. 13 illustrates overlapping of pixel electrodes PE1 and PE2 and the common electrode CE when viewed from the fifth polarization layer 42 side. Each pixel electrode P described above with reference to FIG. 2 is the pixel electrode PE1 or PE2 in FIG. 13. The pixel substrate 31 includes a plurality of scanning lines G and a plurality of signal lines S. The scanning lines G each extend in the first direction X and are arranged at intervals in the second direction Y. The signal lines S each extend substantially in the second direction Y and are arranged at intervals in the first direction X.

A plurality of pixel electrodes PE1 are arranged in the first direction X. Each pixel electrode PE1 includes strip electrodes Pa1 overlap the common electrode CE. The strip electrodes Pa1 extend in a direction D1 different from the first direction X and the second direction Y. A plurality of pixel electrodes PE2 are arranged in the first direction X. Each pixel electrode PE2 includes strip electrodes Pa2 overlap the common electrode CE. The strip electrodes Pa2 extend in a direction D2 different from the direction D1. The numbers of strip electrodes Pa1 and Pa2 may be one or may be equal to or larger than three.

The display device 1 according to the embodiment is described above with reference to FIGS. 1 to 13. The following describes modifications of the embodiment with reference to FIGS. 13 to 20.

First Modification

In the embodiment, the rubbing direction of one of two alignment films (the alignment films 23*a* and 24*a*) facing each other with the liquid crystal LM interposed therebetween in each liquid crystal panel 20 is different from the rubbing direction of the other alignment film by 90°. In other words, the twist angle of each liquid crystal panel 20 is 90° in the embodiment but is not limited thereto. For example, the twist angle of each liquid crystal panel 20 may be smaller than 90°. The twist angle of a liquid crystal panel 20 (for example, the second liquid crystal panel 20B) provided as an O-mode liquid crystal panel may be smaller than the twist angle of a liquid crystal panel 20 (for example, the first liquid crystal panel 20A) provided as an E-mode liquid crystal panel. The relation between the twist angle and optical characteristics of each liquid crystal panel 20 will be described below with reference to FIGS. 14 to 18.

Figure 14:
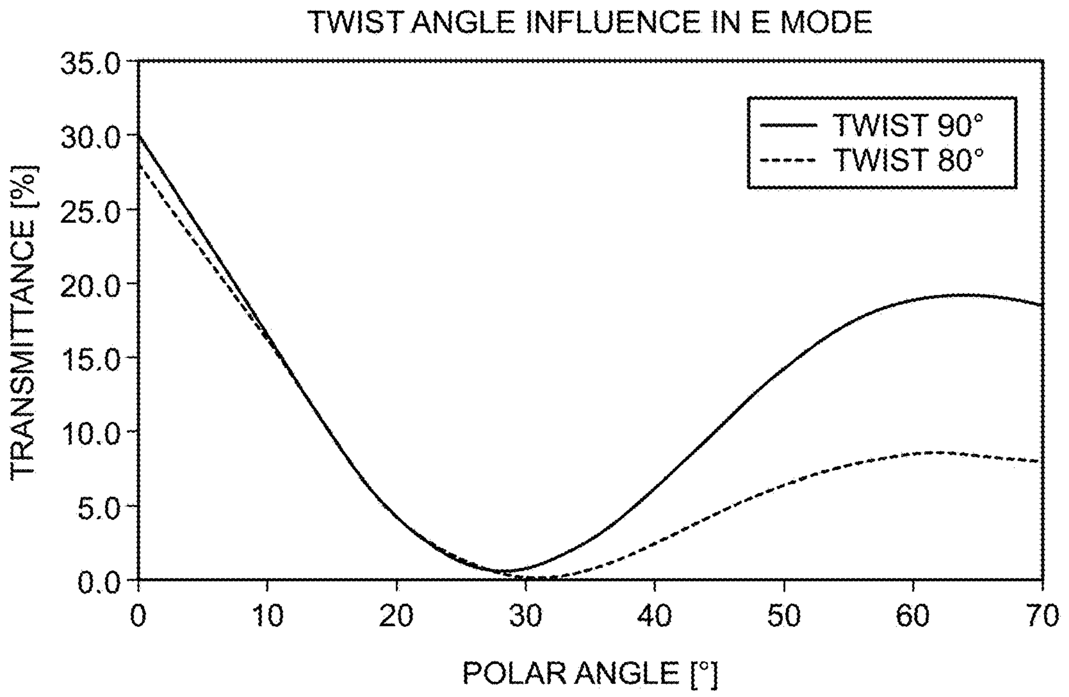
FIG. 14 is a graph illustrating the relation between the polar angle and the transmittance of light when a liquid crystal panel provided as an E-mode liquid crystal panel is in operation (ON) in each of a case where the twist angle is 90° (TWIST 90°) and a case where the twist angle is 80° (TWIST 80°)

FIG. 14 is a graph illustrating the relation between the polar angle and the transmittance of light when the liquid crystal panel 20 provided as an E-mode liquid crystal panel is in operation (ON) in each of a case where the twist angle is 90° (TWIST 90°) and a case where the twist angle is 80° (TWIST 80°). FIGS. 15 and 16 are graphs illustrating the normalized transmittance on the one side and the other side in the first direction X when the liquid crystal panel 20 provided as an E-mode liquid crystal panel is in operation (ON) in each of a case where the twist angle is 90° (TWIST 90°) and a case where the twist angle is 80° (TWIST 80°).

As illustrated in FIG. 14, in the E mode, within a polar angle range from 0° to approximately 25° or more and less than 30°, the degree of decrease in the transmittance with the increase in the polar angle when the twist angle is 90° is steeper than that when the twist angle is 80°. Thus, as illustrated in FIGS. 15 and 16, in a polar angle range from 0° to approximately 25° or more and less than 30°, in other words, in the case of the liquid crystal panel 20 provided as an E-mode liquid crystal panel, a configuration with the twist angle closer to 90° tends to be more preferable than a configuration with the twist angle of 80° only within a view angle range on the positive (+) side of the view angle of −30° because the normalized transmittance more excellently decreases as the view angle is closer to the other side in the first direction X.

However, in the case of the liquid crystal panel 20 provided as an E-mode liquid crystal panel, the transmittance when the twist angle is 90° becomes higher than that when the twist angle is 80° in a polar angle range exceeding 30°. Thus, it is preferred to lower the normalized transmittance by another means in a view angle range on the negative (−) side of the view angle of −30°.

FIGS. 17 and 18 are graphs illustrating the normalized transmittance on the one side and the other side in the first direction X when the liquid crystal panel 20 provided as an O-mode liquid crystal panel is in operation (ON) in each of a case where the twist angle is 90° (TWIST 90°) and a case where the twist angle is 80° (TWIST 80°). As illustrated in FIGS. 17 and 18, in the O mode, within a polar angle range from 0° to approximately 35°, the transmittance when the twist angle is 80° is substantially equal to or lower than that when the twist angle is 90°. In the O mode, within a polar angle range equal to or larger than 40°, the transmittance when the twist angle is 80° is significantly lower and substantially stable as compared to that when the twist angle is 90°. Thus, in the case of the liquid crystal panel 20 provided as an O-mode liquid crystal panel, there is a tendency that, when the twist angle is 80°, sufficiently low normalized transmittance can be sufficiently ensured in the view angle range on the positive (+) side of the view angle of −40° and lower normalized transmittance can be obtained in the view angle range on the negative (−) side.

In a first modification, the twist angles of the first liquid crystal panel 20A and the second liquid crystal panel 20B included in the light adjuster 10 are set based on the tendencies in the E and O modes described above with reference to FIGS. 14 to 18 so that the twist angle of the liquid crystal panel 20 provided as an O-mode liquid crystal panel (for example, the second liquid crystal panel 20B) is smaller than the twist angle of the liquid crystal panel 20 provided as an E-mode liquid crystal panel (for example, the first liquid crystal panel 20A) as described above. As a specific example of the twist angles in the first modification, the twist angle of the first liquid crystal panel 20A is 90° or smaller than 90° but closer to 90°. In this specific example, the twist angle of the second liquid crystal panel 20B is 80°. With this configuration, it is possible to more reliably obtain both a sharper light-shielding cutoff characteristic on the other side in the first direction X with the E mode and a broader light-shielding view angle range with the O mode.

Since the twist angles in the first modification are different from those in the embodiment, the angles of the transmission axis directions V05 and V07 (refer to FIG. 3) are set as angles corresponding to the twist angles in the first modification. Even in a case where the above-described specific example of the twist angles in the first modification is employed, transmission of light through the transmission path LV can be established as in the embodiment by increasing the angle of the slow axis direction V08 of the retardation generation layer 52 (for example, from approximately −27.5° to approximately −28°). Alternatively, transmission of light through the transmission path LV may be established by adjusting a polarization-related characteristic other than the slow axis direction V08 in accordance with the first modification, for example, by adjusting the transmission axis direction V09 and the transmission axis direction V11.

Second Modification

Figure 19:
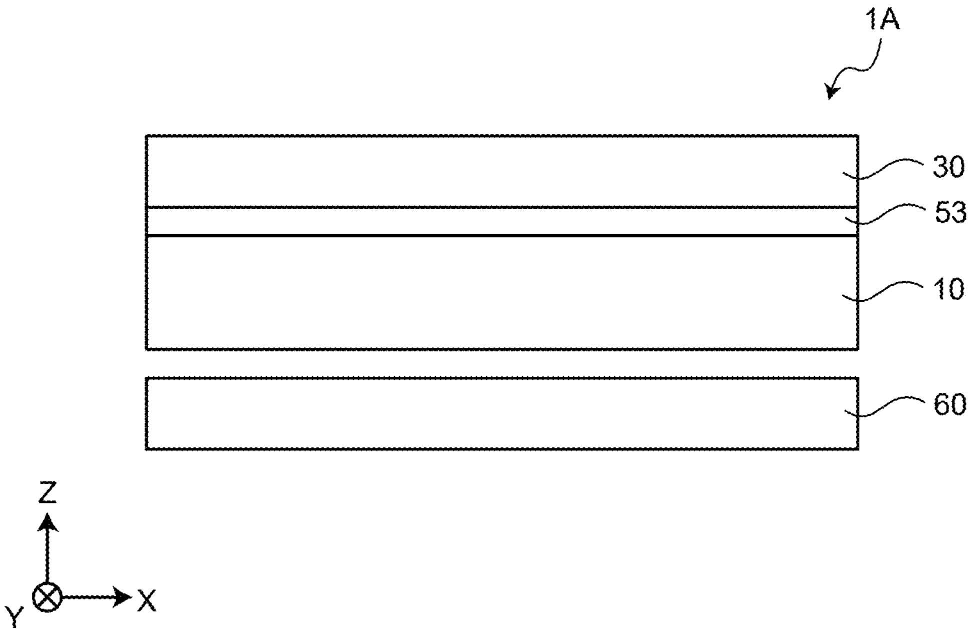
FIG. 19 is a schematic view illustrating an example of a main configuration of a display device according to a second modification.

FIG. 19 is a schematic view illustrating an example of a main configuration of a display device 1A according to a second modification. The display device 1A is the same as the display device 1 (refer to FIG. 1) according to the embodiment except for omission of the retardation generation layer 51 from the configuration of the display device 1 and matters to be described below about the polarization angle of the polarization generation layer 53.

Although the retardation generation layer 51 is provided in the embodiment, the retardation generation layer 51 can be omitted as illustrated in FIG. 19 by changing the polarization angle of the polarization generation layer 53, which is set so that light emitted from the other surface of the light source 60 is transmitted as polarized light of 0° in the embodiment. The polarization angle of the polarization generation layer 53 in the second modification will be described below with reference to FIG. 20.

Figure 20:
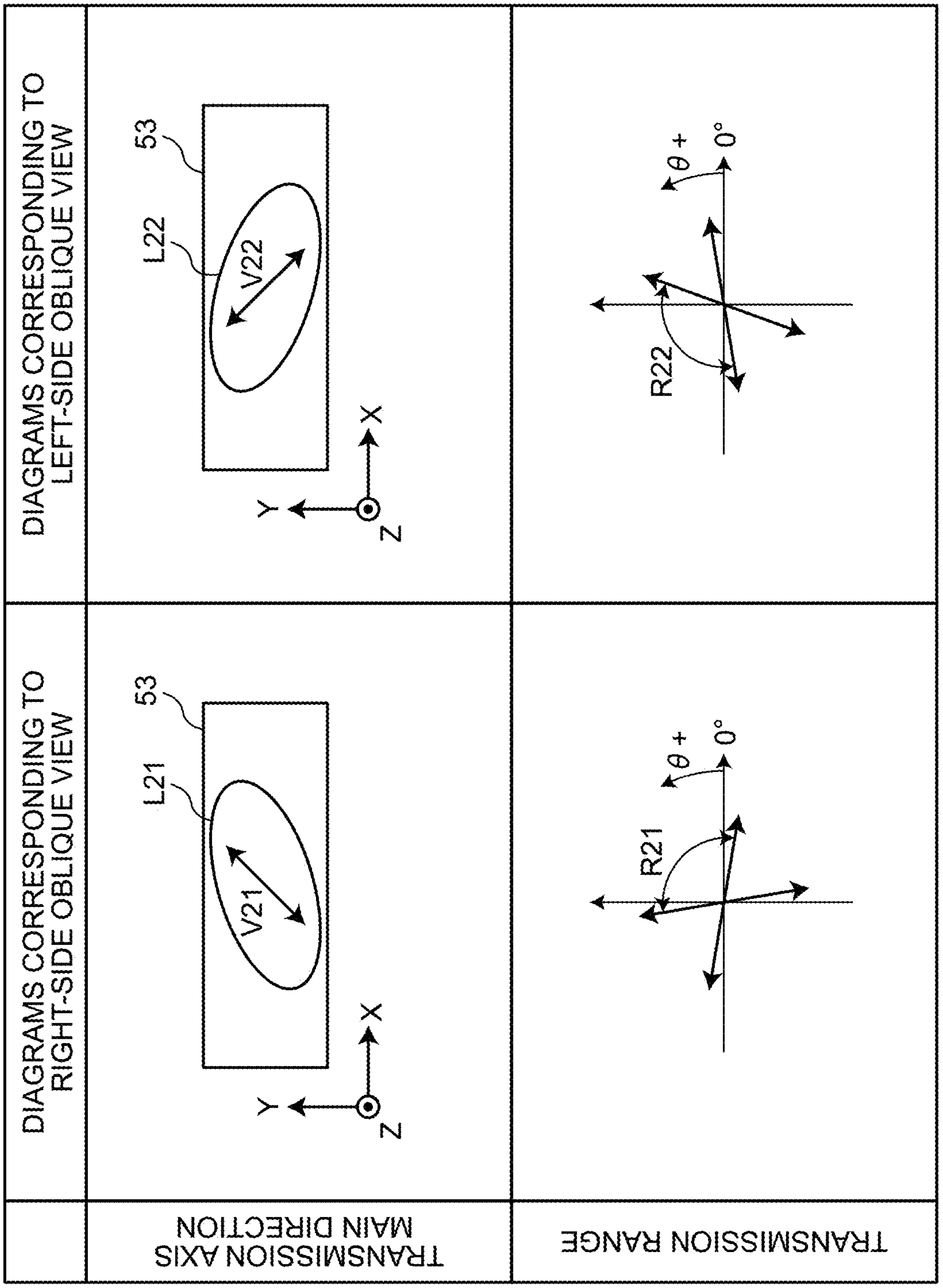
FIG. 20 is a schematic view illustrating a polarization angle, which may be employed as an example of the polarization angle of a polarization generation layer in the second modification, and an angle range in which the polarization angle can be set.

FIG. 20 is a schematic view illustrating polarization axis directions V21 and V22, which may be employed as examples of the polarization angle of the polarization generation layer 53 in the second modification, and angle ranges R21 and R22 in which the polarization angle can be set. For example, assume a case where there is an object such as a reflection body 102 illustrated in FIG. 8, which reflects light LS3 from the display device 1, thereby generating light LS4. In this case, when the light LS4 reaches the user U2, a situation may unintentionally occur in which the image DSP output from the display device 1 in the second state can be viewed by the user U2 as well. For example, in a case where FIG. 8 illustrates an example of the inside of a four-wheel automobile, the situation potentially occurs when a side glass on the front passenger seat side functions as the reflection body 102.

Thus, in the second modification, the polarization angle of the polarization generation layer 53 is set so that generation of the light LS3 is reduced. Specifically, for reducing the generation of the light LS3 in the relation between the display device 1 and the user U2 as illustrated in FIG. 8, the polarization angle is set so as to be in a direction such as the polarization axis direction V22 in FIG. 20, which extends along an X-Y plane and intersects the first direction X and the second direction Y. More specifically, in this case, the polarization axis direction V22 of the polarization generation layer 53 according to the second modification is set so that, for example, light emitted from the other surface of the light source 60 is transmitted as polarized light of +135°. In such a case, the transmission path LV of light is not established in a range from the slow axis direction V02 to the transmission axis direction V11 in the embodiment described above with reference to FIG. 3, but the transmission path LV of light is established in this case as well when the relation between the one side in the first direction X and the other side in the first direction X in the above description of polarization with reference to FIG. 3 is inverted. With the polarization axis direction V22, light emitted from the light source 60 and passing through the polarization generation layer 53 has an elliptical spread like a light region L22. The relation of the major axis and minor axis of an ellipse illustrated as the light region L22 in FIG. 20 with the polarization axis direction V22 is such that the acute angle between the major axis and the polarization axis direction V22 is smaller than the acute angle between the minor axis and the polarization axis direction V22. Such a light spread expressed by an ellipse reduces generation of the light LS3 traveling from the display device 1 toward the reflection body 102 side in FIG. 8.

In a case where the user U2 illustrated in FIG. 8 is the driver of a four-wheel automobile, for example, the handle of the four-wheel automobile is positioned at or near the position of a component 101 facing the user U2 in the third direction Z. Thus, in a case where FIG. 8 is an example of the inside of a four-wheel automobile, the example is a left-hand-drive example. In a right-hand-drive case, the positional relation between the display device 1 and the component 101 is inverted. Specifically, in this case, the user U2 views the display device 1 from the front, and the user U1 obliquely views the component 101 from the one side in the first direction X. In such a case, the relation between the one side in the first direction X and the other side in the first direction X in description with reference to FIG. 7 can be inverted by, for example, rotating the retardation generation layer 51, the light adjuster 10, and the retardation generation layer 52 among components of the display device 1 by 180° relative to the other components about a rotational axis along the third direction Z, and thus, the same relation between front view and oblique view illustrated in FIG. 9 can be achieved. Specifically, with physical orientation of each liquid crystal panel 20, "the relation between the one side in the first direction X and the other side in the first direction X" in description with reference to FIG. 7 can be set in the display device 1 as appropriate. In the right-hand-drive case, the above-described "situation in which the image DSP output from the display device 1 in the second state can be viewed by the user U2 as well" unintentionally occurs in some cases because of a reflection body 103 on the user U2 side in place of the reflection body 102 on the user U1 side in the left-hand-drive case.

In the right-hand-drive case, the polarization axis direction V21 of the polarization generation layer 53 according to the second modification is set so that, for example, light emitted from the other surface of the light source 60 is transmitted as polarized light of +45°. In this case, the transmission path LV of light is established by a configuration obtained by removing the retardation generation layer 51 from the configuration of the embodiment described above with reference to FIG. 3. With the polarization axis direction V21, light emitted from the light source 60 and passing through the polarization generation layer 53 has an elliptical spread like a light region L21, which is different from the light region L22. The relation of the major axis and minor axis of an ellipse illustrated as the light region L21 in FIG. 20 with the polarization axis direction V21 is such that the acute angle between the major axis and the polarization axis direction V21 is smaller than the acute angle between the minor axis and the polarization axis direction V21.

The polarization axis of the polarization generation layer 53 in the second modification is not limited to the polarization axis direction V21 nor V22. For example, in the right-hand-drive case, the polarization axis may be set in the angle range R21 of −15° to +105°. In the left-hand-drive case, the polarization axis may be set in the angle range R22 of +75° to +195°. However, even in the angle range R21 or R22, the polarization axis desirably does not align with a direction corresponding to the arrangement direction of the users U1 and U2, in other words, the first direction X (0°, 180°). A combined form of the first and second modifications may be applicable.

As described above, a display device (the display device 1) includes a display panel (the display panel 30) having a display region configured to output an image, a light source (the light source 60) configured to emit light toward one surface side of the display panel, and a light adjuster (the light adjuster 10) interposed between the display panel and the light source and provided to be able to change the transmission degree of light between the display panel and the light source. In the light adjuster, a first polarization layer (the first polarization layer 11), a first liquid crystal panel (the first liquid crystal panel 20A), a second polarization layer (the second polarization layer 12), a second liquid crystal panel (the second liquid crystal panel 20B), and a third polarization layer (the third polarization layer 13) are stacked from the light source side toward the display panel side, and one (for example, the first liquid crystal panel 20A) of the first and second liquid crystal panels is provided as an E-mode liquid crystal panel, and the other (for example, the second liquid crystal panel 20B) of the first and second liquid crystal panels is provided as an O-mode liquid crystal panel.

With this configuration, it is possible to achieve image display output exploiting advantages of both the E-mode and O-mode liquid crystal panels. The advantage of the E-mode liquid crystal panel is steep decline in the transmittance of light for the line of light at a specific angle (for example, at or near the view angle of −30°). The advantage of the O-mode liquid crystal panel is stable decline in the transmittance of light in a broader range (for example, on the negative (−) side of the view angle of −30°). Any of the E-mode and O-mode liquid crystal panels can transmit light with which the image can be sufficiently viewed in a view angle range except for a view angle range in which the transmittance of light decreases significantly. In this manner, according to the embodiment, it is possible to simultaneously establish the view angle range in which the image can be viewed and the view angle range in which the image cannot be viewed, and more reliably ensure a wider view angle range in which the image cannot be viewed.

Each of the first liquid crystal panel (first liquid crystal panel 20A) and the second liquid crystal panel (second liquid crystal panel 20B) includes two alignment films (the alignment films 23*a* and 24*a*) facing each other with a liquid crystal (the liquid crystal LM) interposed therebetween. One alignment film (the alignment film 23*a*) of the two alignment films is disposed on the light source (light source 60) side of the liquid crystal, and the other alignment film (alignment film 24*a*) of the two alignment films is disposed on the display panel side of the liquid crystal. The one alignment film of the first liquid crystal panel and the one alignment film of the second liquid crystal panel have a common first rubbing direction, and the other alignment film of the first liquid crystal panel and the other alignment film of the second liquid crystal panel have a common second rubbing direction. Thus, two identical liquid crystal panels (liquid crystal panels 20) are prepared, and one of the two liquid crystal panels can be used as an E-mode liquid crystal panel and the other thereof can be used as an O-mode liquid crystal panel. This eliminates the need to individually manufacture the E-mode liquid crystal panel and the O-mode liquid crystal panel, and accordingly, the display device of the embodiment can be provided as a display device with higher productivity and lower cost.

The twist angle of liquid crystal in the O-mode liquid crystal panel is smaller than the twist angle of liquid crystal in the E-mode liquid crystal panel, and thus both the above-described advantages of the E-mode and O-mode liquid crystal panels can be improved and used.

The twist angle of liquid crystal in each of the first liquid crystal panel (first liquid crystal panel 20A) and the second liquid crystal panel (second liquid crystal panel 20B) is smaller than 90°, and thus both the above-described advantages of the E-mode and O-mode liquid crystal panels can be improved and used.

The display device (display device 1) further includes a polarization generation layer (the polarization generation layer 53) provided between the light source (light source 60) and the light adjuster (light adjuster 10) and configured to polarize light emitted from the light source in a specific direction. The specific direction is a direction (for example, the polarization axis direction V21 or the polarization axis direction V22) intersecting all four sides of the display region (display region AA) having a rectangular shape, and thus it is easier to reduce unintended viewing of an image due to a reflection body (for example, the reflection body 102) at a position opposite to a user on a side where oblique viewing of the image is to be reduced.

When the first liquid crystal panel (first liquid crystal panel 20A) and the second liquid crystal panel (second liquid crystal panel 20B) are in operation, the light adjuster (display panel 30) causes the transmission degree of light tilted toward one side in the longitudinal direction of the display panel having a rectangular shape (one side in the first direction X) with respect to a facing direction (the third direction Z) and the transmission degree (the other side in the first direction X) of light tilted toward the other side in the longitudinal direction to be different from each other, and the facing direction is a direction in which the display panel (display panel 30) and the light source (light source 60) face each other. Accordingly, it is possible to simultaneously establish the view angle range in which the image can be viewed and the view angle range in which the image cannot be viewed.

The positional relation between the E-mode liquid crystal panel and the O-mode liquid crystal panel between the display panel (display panel 30) and the light source (light source 60) may be the inverse of that in the embodiment. In this case, the relation between the transmission axis direction and the absorption axis direction of each of the first polarization layer 11, the second polarization layer 12, and the third polarization layer 13 may be inverted. The slow axis directions V02 and V08 of the retardation generation layers 51 and 52 may be changed so that the slow axis directions are line symmetric with respect to the second direction Y.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:

a display panel having a display region configured to output an image;

a light source configured to emit light toward one surface side of the display panel; and a light adjuster interposed between the display panel and the light source and provided to be able to change a transmission degree of light between the display panel and the light source, wherein in the light adjuster, a first liquid crystal panel, a first polarization layer, a second liquid crystal panel, and a second polarization layer are stacked from the light source side toward the display panel side, one of the first and second liquid crystal panels is provided as an E-mode liquid crystal panel, and the other of the first and second liquid crystal panels is provided as an O-mode liquid crystal panel, in the E-mode liquid crystal panel, a rubbing direction of an alignment film stacked directly on a substrate and an orientation axis of a polarization layer contacting the substrate are parallel to each other, and in the O-mode liquid crystal panel, a rubbing direction of an alignment film stacked directly on a substrate and an orientation axis of a polarization layer contacting the substrate are orthogonal to each other, a twist angle of the E-mode liquid crystal panel is 90°, or smaller than 90° and close to 90°, and a twist angle of the O-mode liquid crystal panel is 80°, and a normalized transmittance is less than 0.10 at a viewing angle ranging from −70 degrees to −20 degrees.

2. The display device according to claim 1, wherein each of the first and second liquid crystal panels includes two alignment films facing each other with liquid crystal interposed between the two alignment films, wherein one alignment film of the two alignment films is disposed on the light source side of the liquid crystal, and the other alignment film of the two alignment films is disposed on the display panel side of the liquid crystal, wherein the one alignment film of the first liquid crystal panel and the one alignment film of the second liquid crystal panel have a common first rubbing direction, and wherein the other alignment film of the first liquid crystal panel and the other alignment film of the second liquid crystal panel have a common second rubbing direction.

3. The display device according to claim 1, further comprising a polarization generation layer provided between the light source and the light adjuster and configured to polarize light emitted from the light source in a specific direction, wherein the specific direction is a direction intersecting all four sides of the display region having a rectangular shape.

4. The display device according to claim 1, wherein, in case that the first and second liquid crystal panels are in operation, the light adjuster causes a first transmission degree and a second transmission degree to be different from each other, the first transmission degree is a transmission degree of light tilted toward one side in a longitudinal direction of the display panel having a rectangular shape with respect to a facing direction, the second transmission degree is a transmission degree of light tilted toward the other side in the longitudinal direction, and the facing direction is a direction in which the display panel and the light source face each other.

* * * * *